United States Patent
Qiu et al.

(10) Patent No.: US 9,497,229 B2
(45) Date of Patent: Nov. 15, 2016

(54) METHODS AND APPARATUS TO MANAGE INTERNET PROTOCOL (IP) MULTIMEDIA SUBSYSTEM (IMS) NETWORK CAPACITY

(75) Inventors: Chaoxin Charles Qiu, Austin, TX (US); Bernard Ku, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1952 days.

(21) Appl. No.: 11/749,415

(22) Filed: May 16, 2007

(65) Prior Publication Data
US 2008/0285543 A1 Nov. 20, 2008

(51) Int. Cl.
*H04L 29/06* (2006.01)
*H04L 29/14* (2006.01)

(52) U.S. Cl.
CPC ........... *H04L 65/1069* (2013.01); *H04L 69/40* (2013.01); *H04L 65/1016* (2013.01); *H04L 65/80* (2013.01)

(58) Field of Classification Search
CPC ............. H04L 65/1016; H04L 65/1069; H04L 65/80; H04L 69/40
USPC ......................... 370/352–356, 230
See application file for complete search history.

(56) References Cited

U.S. PATENT DOCUMENTS

| | | | |
|---|---|---|---|
| 5,507,035 A | 4/1996 | Bantz et al. | |
| 5,956,393 A | 9/1999 | Tessler et al. | |
| 6,151,491 A | 11/2000 | Farris et al. | |
| 6,356,755 B1 | 3/2002 | Valentine et al. | |
| 6,356,767 B2 | 3/2002 | Froula | |
| 6,542,491 B1 | 4/2003 | Tari et al. | |
| 6,760,594 B1 | 7/2004 | Murasawa et al. | |
| 6,968,050 B1 | 11/2005 | Pershan et al. | |
| 7,099,671 B2 | 8/2006 | Liang | |
| 7,158,803 B1 | 1/2007 | Elliott | |
| 7,161,468 B2 | 1/2007 | Hwang et al. | |
| 7,212,506 B2 | 5/2007 | Varney et | |
| 2002/0024943 A1 | 2/2002 | Karaul et al. | |
| 2002/0101860 A1 | 8/2002 | Thornton et al. | |
| 2002/0176545 A1 | 11/2002 | Schweitzer | |
| 2003/0053480 A1 | 3/2003 | Jang et al. | |
| 2003/0119506 A1 | 6/2003 | Singhai et al. | |
| 2003/0129988 A1* | 7/2003 | Lee et al. ........................ 455/450 |
| 2003/0131132 A1* | 7/2003 | Cheng ................. H04L 12/6418 709/239 |
| 2004/0095954 A1 | 5/2004 | Varney et al. | |
| 2004/0165529 A1 | 8/2004 | Lee | |

(Continued)

OTHER PUBLICATIONS

Acme Packet, "Net-Safe—The Security Requirements Framework for SBCs", retrieved from <http://acmepacket.com/html/page.asp?PageID=%7BFB2657BA-EE7A-46C1-BEA8>, retrieved on May 16, 2008 (4 pages).

(Continued)

*Primary Examiner* — Khaled Kassim
(74) *Attorney, Agent, or Firm* — Hanley, Flight & Zimmerman, LLC

(57) ABSTRACT

Methods and apparatus to manage Internet Protocol (IP) Multimedia Subsystem (IMS) network capacity are disclosed. An example method comprises identifying a terminating voice over Internet protocol (VoIP) call server associated with a called device, and returning a call rejection indicator when the terminating VoIP call server is in a first condition, the call rejection indicator returned without a call initiation request message sent to the terminating VoIP call server.

20 Claims, 10 Drawing Sheets

(56) References Cited

U.S. PATENT DOCUMENTS

| | | | |
|---|---|---|---|
| 2005/0163126 A1* | 7/2005 | Bugenhagen et al. | 370/395.2 |
| 2005/0186974 A1* | 8/2005 | Cai | 455/466 |
| 2005/0286499 A1 | 12/2005 | Kobayashi et al. | |
| 2006/0030290 A1 | 2/2006 | Rudolf et al. | |
| 2006/0056382 A1 | 3/2006 | Yamada et al. | |
| 2006/0077962 A1* | 4/2006 | Wu et al. | 370/352 |
| 2006/0077983 A1 | 4/2006 | Miyajima et al. | |
| 2006/0083222 A1 | 4/2006 | Miyajima et al. | |
| 2006/0109833 A1 | 5/2006 | Uh et al. | |
| 2006/0116128 A1* | 6/2006 | Benveniste | 455/445 |
| 2006/0153076 A1* | 7/2006 | Bradd | 370/230 |
| 2006/0245573 A1 | 11/2006 | Sheth et al. | |
| 2006/0274766 A1 | 12/2006 | Kwon | |
| 2007/0019623 A1* | 1/2007 | Alt et al. | 370/352 |
| 2007/0032255 A1 | 2/2007 | Koo et al. | |
| 2007/0061397 A1* | 3/2007 | Gregorat | H04L 29/1216 709/203 |
| 2007/0070989 A1 | 3/2007 | Savoor et al. | |
| 2007/0165821 A1 | 7/2007 | Altberg et al. | |
| 2007/0171823 A1 | 7/2007 | Hunt et al. | |
| 2007/0286352 A1 | 12/2007 | Yasrebi et al. | |
| 2008/0056234 A1* | 3/2008 | Sprague | 370/352 |
| 2008/0117809 A1* | 5/2008 | Wang | H04L 29/06027 370/229 |
| 2008/0267064 A1* | 10/2008 | Broadhurst | H04Q 3/0091 370/230 |
| 2010/0011118 A1* | 1/2010 | Chang et al. | 709/235 |
| 2010/0027532 A1 | 2/2010 | Sparks et al. | |

OTHER PUBLICATIONS

Acme Packet, "Net-Net OS-SBC—Acme Packet Net-Net Session Border Controllers," retrieved from <http://acmepacket.com/html/page.asp?PageID=%7b06E4AEBC-24E2-46CC-BA95>, retrieved on May 16, 2008 (4 pages).

United States Patent and Trademark Office, "Final Office Action," issued in connection with U.S. Appl. No. 12/184,516, mailed Oct. 4, 2012 (20 pages).

United States Patent and Trademark Office, "Final Office Action," issued in connection with U.S. Appl. No. 12/184,516, mailed Jun. 2, 2014 (16 pages).

United States Patent and Trademark Office, "Non-Final Office Action," issued in connection with U.S. Appl. No. 12/184,516, mailed Apr. 10, 2012 (16 pages).

United States Patent and Trademark Office, "Non-Final Office Action," issued in connection with U.S. Appl. No. 12/184,516, mailed Dec. 17, 2013 (18 pages).

United States Patent and Trademark Office, "Non-Final Office Action," issued in connection with U.S. Appl. No. 12/184,516, mailed Apr. 23, 2015 (16 pages).

United States Patent and Trademark Office, "Non-Final Office Action," issued in connection with U.S. Appl. No. 12/184,516, mailed Nov. 2, 2015 (16 pages).

United States Patent and Trademark Office, "Notice of Allowance," issued in connection with U.S. Appl. No. 12/184,516, mailed Jun. 3, 2016 (7 pages).

* cited by examiner

METHODS AND APPARATUS TO MANAGE INTERNET PROTOCOL (IP) MULTIMEDIA SUBSYSTEM (IMS) NETWORK CAPACITY

FIELD OF THE DISCLOSURE

This disclosure relates generally to Internet Protocol (IP) Multimedia Subsystem (IMS) networks and, more particularly, to methods and apparatus to manage IMS network capacity.

BACKGROUND

In communication networks, such as Internet Protocol (IP) Multimedia Subsystem (IMS) networks, communication sessions are routed through a communication network from an originating device (e.g., a voice over IP (VoIP) telephone and/or plain old telephone service (POTS) telephone) to a terminating device (e.g., a VoIP telephone and/or a POTS telephone). If at a particular moment, a terminating server (e.g., a serving call session control function (S-CSCF) server) associated with the terminating device is unable to support and/or handle the communication session directed to the terminating device (e.g., due to a current processing load, a current lack of available resources, a current transmission facility load, etc.), the terminating server may reject the communication session prior to it being established to the terminating device.

DETAILED DESCRIPTION

Methods and apparatus to manage Internet Protocol (IP) Multimedia Subsystem (IMS) network capacity are disclosed. A disclosed example method includes identifying a terminating voice over Internet protocol (VoIP) call server associated with a called device, and returning a call rejection indicator when the terminating VoIP call server is in a first condition, the call rejection indicator returned without a call initiation request message sent to the terminating VoIP call server.

A disclosed example usage and capacity control server for an Internet protocol (IP) Multimedia Subsystem (IMS) network includes an interface to receive an identifier associated with a called device in response to an tElephone NUMber mapping (ENUM) query, and a call admission controller to determine whether to admit a communication session between the called device and a calling device based on a state of a terminating call server associated with the called device without a call initiation request message sent to the terminating call server. A disclosed example apparatus includes an interface to receive a called device identifier, and a processor to identify a terminating voice over Internet protocol (VoIP) call server associated with the called device identifier and to return a call rejection indicator when the terminating VoIP call server is in a first condition, the call rejection indicator returned without a call initiation request message sent to the terminating VoIP call server.

In the interest of brevity and clarity, throughout the following disclosure references will be made to the example IMS communication system, the example IMS network 115, the example IP networks 120 and 121, the example access networks 110 and 111, and/or the example IMS devices 105 and 106 of FIG. 1. Moreover, the following disclosure will utilize session initiation protocol (SIP) messages and/or message exchanges. However, it should be understood that the methods and apparatus to manage the capacity of the example IMS network 115 described herein are applicable to other VoIP communication systems and/or networks (e.g., based on soft switches), IMS devices, access networks, IP networks, IMS networks and/or IMS communication systems, and/or other types of protocols, messages, and/or message exchanges.

Figure 1:
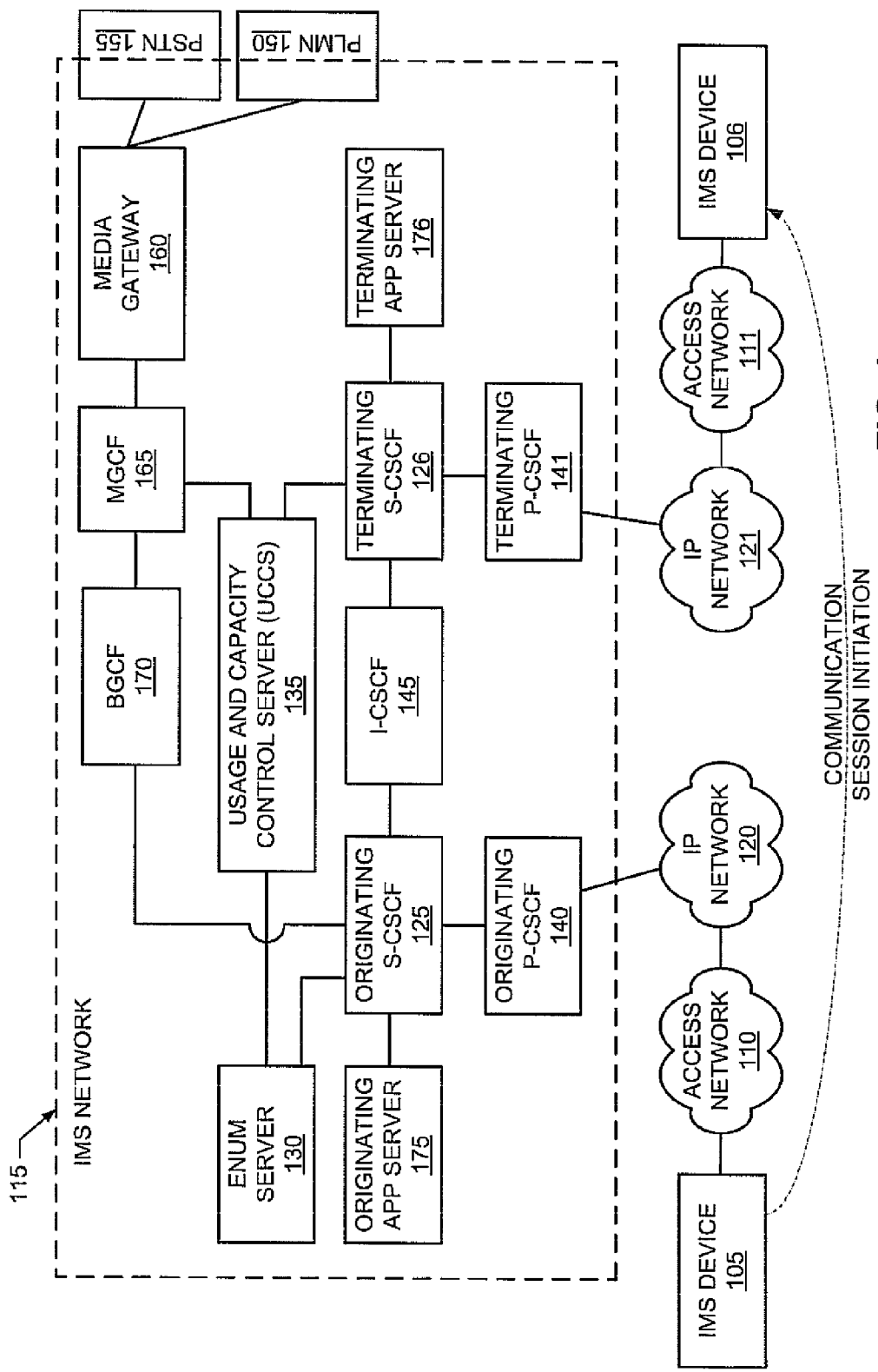
FIG. 1 is a schematic illustration of an example Internet Protocol Multimedia Subsystem (IMS) based communication system constructed in accordance with the teachings of the invention.

FIG. 1 is a schematic illustration of an example Internet Protocol (IP) Multimedia Subsystem (IMS) communication system that includes any number and/or type(s) of IMS devices, two of which are designated at reference numerals 105 and 106. Example IMS devices 105 and 106 include, but are not limited to, an IMS (e.g., voice over Internet Protocol (VoIP)) phone, an IMS residential gateway, an IMS enabled personal computer (PC), an IMS endpoint, a wireless IMS device (e.g., a wireless-fidelity (WiFi) Internet protocol (IP) phone), an IMS adapter (e.g., an analog telephone adapter (ATA)), an IMS enabled personal digital assistant (PDA), and/or an IMS kiosk. The example IMS devices 105 and 106 of FIG. 1 may be implemented and/or found at any number and/or type(s) of locations. Further, the IMS devices 105 and 106 may be fixed location devices, substantially fixed location devices and/or mobile devices. Moreover, the IMS devices 105 and 106 may have equipment communicatively and/or electrically coupled to them. For example, an IMS ATA may be coupled to a telephone, and/or an IMS residential gateway may be coupled to a PC and/or set-top box.

To access IMS communication services throughout and/or within a site, location, building, geographic area and/or geographic region, the example IMS communication system of FIG. 1 includes any number and/or type(s) of access networks, two of which are designated in FIG. 1 with reference numbers 110 and 111. In general, the example access networks 110 and 111 provide and/or facilitate a communicative coupling of the IMS devices 105 and 106 to and/or with an IMS network 115, which provides and/or enables IMS communication services to the IMS device 105 and 106. However, in some examples, one or more of the IMS devices 105 and 106 may access the IMS network 115 without use of an access network 110, 111. The example access networks 110 and 111 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

While in the illustrated example of FIG. 1, each of the example IMS devices 105 and 106 are depicted as having an associated access network 110, 111, such depictions are merely illustrative. For example, the example IMS devices 105 and 106 may utilize a common access network 110, 111, an IMS device 105, 106 may be configured and/or capable to utilize more than one access network 110, 111 at the same and/or different times, an IMS device 105-107 may be configured to access the IMS network 115 directly or via the IP network 120 without an intervening access network 110, etc.

To provide IMS communication services (e.g., telephone services, Internet services, data services, messaging services, instant messaging services, electronic mail (email) services, chat services, video services, audio services, gaming services, etc.), the example IMS communication system of FIG. 1 includes one or more IMS networks, one of which is designated in FIG. 1 with reference numeral 115. As described more fully below, the example IMS network 115 of FIG. 1 tracks and/or determines the current processing loads and/or current resource utilizations of the IMS network 115, and uses the same to make call admission decisions. When a request to initiate a communication session (e.g., a session initiation protocol (SIP) INVITE message) is received by the IMS network 115, the communication session request is initially handled by a call server associated with the calling party that sent the communication session request. As used herein, the term "originating call server" will be used to designate the call server associated with the calling party. The originating call server determines and/or locates the call server responsible for handling the communication session for the called party (e.g., by querying an tElephone NUMber mapping (ENUM) server 130 and/or an interrogating call session control function (I-CSCF) server 145), and forwards and/or sends the communication session request to the terminating call server so that the communication session may be, and/or may be attempted to be, established to the called party. As used herein, the term "terminating call server" will be used to designate the call server associated with the called device and/or party. Example originating and terminating call servers include, but are not limited to, a serving call session control function (S-CSCF) server, a media gateway control function (MGCF) server, and/or a softswitch. Depending upon whether a call server is associated with a calling or a called party, the call server may be either an originating call server or a termination call server. Moreover, a call server may be simultaneously an originating call server for a first communication session and a terminating call server for a second communication session. Thus, the designations of originating and termination in FIG. 1 are merely to facilitate ease of understanding of the methods and apparatus described here.

In the illustrated example of FIG. 1, originating call servers, in conjunction with other elements of the IMS network 115 (e.g., the example ENUM server 130 and/or an example usage and capacity control server (UCCS) 135), utilizes information regarding the condition and/or workload (e.g., processor load and/or memory utilization) of terminating call servers, and/or the condition and/or utilization of one or more communication resource associated with the terminating call servers (e.g., switches, trunk groups, trunks, terminating tenant group, terminating tenant, terminating phone number, terminating SIP uniform resource identifier (URI), terminating IP subnets, terminating realm, etc.) to manage the capacity of the IMS network 115. In particular, for a requested communication session, the associated originating call server, in conjunction with other elements of the IMS network 115, determines and/or decides whether the communication session should be admitted. If the communication session should be rejected (i.e., not admitted), the originating call server notifies the calling party of the rejection without sending and/or forwarding the communication session request to the terminating call server. If the communication session can be accepted (i.e., admitted) by the IMS network 115 and/or the terminating call server, the originating call server sends and/or forwards the communication session request to the terminating call server. As used herein the term "call rejection indicator" refers to a call rejection message sent by the ENUM server 130 to a S-CSCF server 125, 127, and/or a call admission response message that indicates a call is rejected sent by the UCCS 135 to the ENUM server 130.

In some examples, admission control decisions are made independently of the state of called devices. For example, a communication session directed to a called party may be rejected at an originating call server even though a device (e.g., a telephone) associated with the called party is not busy and/or is available to accept new and/or additional communication sessions. By making call admission control decisions at originating call servers in the example IMS network 115 of FIG. 1, the unnecessary utilization of additional communication and/or processing resources by and/or within the IMS network 115 and/or terminating call servers is substantially reduced. For example, if a terminating call server has insufficient resources to process a new communication session, sending a communication session request for the new communication session to the terminating call server unnecessarily wastes resources of the terminating call server and/or unnecessarily wastes communication resources associated with the terminating call server. In contrast, existing IMS networks reject calls at the terminating call servers if the terminating call servers are overloaded.

In the example IMS communication system of FIG. 1, the example IMS devices 105 and 110 are communicatively coupled to the example IMS network 115 via one or more of the example access networks 110 and/or 111, and/or any number and/or type(s) of private and/or public IP based communication networks such as, for example, the Internet, two of which are illustrated in FIG. 1 with reference numerals 120 and 121. While in the illustrated example of FIG. 1, each of the example IMS devices 105 and 106 are depicted as having an associated IP network 120, 121, such depictions are merely illustrative. For example, the example IMS devices 105 and 106 may utilize the same public IP network, an IMS device 105, 106 may be configured and/or capable to utilize more than one IP network 120, 121 at the same and/or different times, etc. In general, the example IP networks 120 and 121 of FIG. 1 provide and/or facilitate a communicative coupling of the IMS devices 105 and 106 to and/or with the IMS network 115.

In some examples, the IMS devices 105 and 106 may be communicatively coupled to the access networks 110 and 111 via one or more additional IP based networks and/or devices (not shown), such as a local area network (LAN), a gateway and/or a router located within a place of business, a school and/or a residence. The example IMS devices 105 and 106 of FIG. 1 are communicatively coupled to the example access networks 110 and 111, the example IP networks 120 and 121 and/or, more generally, the example IMS network 115 via any number and/or type(s) of past, current and/or future communication network(s), communication system(s), communication device(s), transmission path(s), protocol(s), technique(s), specification(s) and/or standard(s). For instance, the example IMS devices 105 and 106 may be coupled to the example access networks 110 and 111, the example IP networks 120 and 121, and/or the example IMS network 115 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, any or all of the example IMS network 115, the example access networks 110 and 111, and/or the example IP networks 120 and 121 of FIG. 1 may extend geographically to include one or more locations near to and/or encompassing one or more of the IMS devices 105 and 106. For example, the access network 110 may include a wireless access point (not shown) by which, for example, a WiFi IP phone 105 connects to the IP network 120 and the IMS network 115.

In the example IMS communication system of FIG. 1, the example access networks 110 and 111, the example IP networks 120 and 121, and the IMS network 115 need not be owned, implemented, and/or operated by a single service provider. For example, the IMS devices 105 and 106 may access IMS services provided by an IMS network 115 owned, operated and/or implemented by a first service provider via access networks 110 and 111, which are owned, operated and/or implemented by one or more additional service providers. However, any or all of the access networks 110 and 111, the IMS network 115 and/or the IP networks 120 and 121 may be operated by a single service provider.

In the illustrated example IMS communication system of FIG. 1, each IMS device (e.g., the example IMS devices 105 and 106) that is registered to the example IMS network 115 is associated with and/or assigned to an S-CSCF server (two of which are designated in FIG. 1 with reference numerals 125 and 126). The example S-CSCF servers 125 and 126 of FIG. 1 are responsible for handling incoming and/or outgoing IMS communication sessions (e.g., telephone calls, and/or data and/or video sessions) associated with its registered IMS devices 105 and 106. An example manner of implementing any or all of the example S-CSCF servers 125 and 126 of FIG. 1 is described below in connection with FIG. 4.

In the IMS communication system of FIG. 1, the IMS devices 105 and 106 may serve as calling and/or called devices, and the example S-CSCF servers 125 and 126 may function as originating and/or terminating call servers. However, for ease of discussion, the following descriptions assume that a communication session is being initiated from the example IMS device 105 (i.e., the calling party) to the example IMS device 106 (i.e., the called party) and, thus, the example S-CSCF server 125 is the originating call server for the communication session, and the example S-CSCF server 126 is the terminating call server for the communication session. However, the methods and apparatus described herein to make call admission decisions and/or to manage the capacity of the IMS network 115 may be applied to other communication sessions. For example, for a communication session from a POTS telephone (not shown) to the example IMS device 105, the example MGCF 165 of FIG. 1 could serve as the originating call server, with the example S-CSCF server 125 serving as a terminating call server; for a communication session from the IMS device 106 to the IMS device 105, the S-CSCF 126 would serve as the originating call server, and the S-CSCF 125 serving as the terminating call server; and/or for a communication session from the IMS device 106 to a POTS telephone (not shown), the S-CSCF 126 would serve as the originating call server and the MGCF 165 would serve as the terminating call server.

The example S-CSCF servers 125 and 126 of FIG. 1 perform session control, and/or maintain session states for its associated and/or registered IMS devices 105 and 106. For instance, when the calling IMS device 105 initiates an outgoing telephone call to a called device 106, a SIP INVITE message is routed by the IMS network 115 from the IMS device 105 to the originating S-CSCF server 125 associated with that particular IMS device 105. The example S-CSCF servers 125 and 126 also enable communication with call feature servers (e.g., the example application servers 175 and 176 of FIG. 1) for its associated and/or registered IMS devices 105 and 106. The example S-CSCF server 125, in conjunction with the example ENUM server 130 and/or the example usage and capacity control server (UCCS) 135, make a call admission decision for the requested communication session. For admitted communication sessions, the originating S-CSCF server 125 routes and/or assists in establishing an IMS communication path and/or IMS communication session (e.g., a telephone call) with the called device 106 via its associated terminating S-CSCF server 126. While two S-CSCF servers 125 and 126 are illustrated in FIG. 1, the IMS network 115 may include any number and/or type(s) of S-CSCF servers, and each such S-CSCF server may support any number and/or type(s) of IMS devices 105 and 106.

To locate and/or identify the IMS device 105, 106 associated with a called party (e.g., a called telephone number), the example IMS network 115 of FIG. 1 includes any number of ENUM servers, one of which is designated in FIG. 1 with reference numeral 130. Based upon an ENUM query request message received from the originating S-CSCF server 125, the example ENUM server 130 of FIG. 1 performs a lookup of an ENUM database (e.g., the example ENUM database 510 of FIG. 5) that stores associations of called party identifiers (e.g., E.164 telephone numbers) to URIs (e.g., a SIP URI, an application URI and/or an hypertext transfer protocol (HTTP) URI). Thus, for example, by performing an ENUM lookup, a SIP URI (e.g., an IP address) for a called device can be identified based upon a called telephone number assigned to the called device. However, the ENUM database may store any number and/or type(s) of associations between any number and/or type(s) of identifiers. In addition to performing the requested ENUM lookup, the example ENUM server 130 of FIG. 1 consults with the example UCCS 135 to determine whether the requested communication session to the called party should be admitted. If the example UCCS 135 of FIG. 1 determines that the communication session is to be admitted, the ENUM server 130 returns the SIP URI obtained from the ENUM database query to the originating S-CSCF server 125. If the communication session to the called party is to be rejected (i.e., not admitted), the ENUM server 130 returns an error and/or call rejection message. When the originating S-CSCF server 125 receives the error and/or call rejection message, the originating S-CSCF server 125 notifies the calling device 105 that the requested communication session can not be established, without sending and/or forwarding a communication session initiation request to the terminating S-CSCF server 126, thereby saving resources of the terminating S-CSCF server 126 and any communication resources between the originating S-CSCF server 125 and the terminating S-CSCF server 126. For example, the originating S-CSCF server 125 may return a SIP 480 Temporarily Unavailable Message to the calling device, provide engaged and/or network busy tones and/or messages, connect the calling party to an announcement server that notifies the calling party that the communication session can not be established, and/or connect the calling party to a voicemail server and/or a messaging server. An example manner of implementing the example ENUM server 130 of FIG. 1 is described below in connection with FIG. 5.

To make call admission decisions, the example IMS network 115 of FIG. 1 includes any number of usage and capacity control servers (UCCSs), one of which is designated at reference numeral 135. The example UCCS 135 of FIG. 1 receives call admission requests from the example ENUM server 130 and, based on the current and/or historical condition and/or workload (e.g., processor and/or memory utilization) of the terminating S-CSCF server 126 and/or its associated communication paths (e.g., switches, trunk groups, trunks, terminating tenant group, terminating tenant, terminating phone number, terminating SIP URI, terminating IP subnets, terminating realm, etc.), makes a call admission decision for the requested communication session.

The example UCCS 135 of FIG. 1 may, for some conditions, admit a communication session request even though the terminating S-CSCF server 126 and/or its communication resources are heavily loaded. For example, the workload of the terminating S-CSCF server 126 may be ignored if the calling party and/or the called party have a sufficiently high class-of-service (i.e., a class-of-service exceeding a threshold). The example UCCS 135 also periodically and/or aperiodically monitors and/or tracks the dynamic and/or current workload of the S-CSCF servers 125 and 126 and/or the dynamic and/or current utilization of their associated communication paths to facilitate call admission decisions. For example, the example S-CSCF servers 125 and 126 can periodically and/or aperiodically report their condition, workload and/or communication resource utilization to the example UCCS 135. Additionally or alternatively, the example UCCS 135 can periodically and/or aperiodically query and/or poll the S-CSCF servers 125 and 126 and/or the MGCF server 165 for their conditions, workloads and/or communication resource utilizations. An example manner of implementing the example UCCS 135 of FIG. 1 is described below in connection with FIG. 2.

Because in the illustrated example of FIG. 1, the example UCCS 135 is queried and/or consulted by the example ENUM server 130 rather than by the originating call server, not all of the call servers of the example IMS network 115 need to be modified and/or updated to support the example methods and/or apparatus described herein. However, in some examples, one or more of the call servers may be modified to provide and/or implement additional capabilities, functionalities and/or responses when a communication session request is to be rejected. For example, a call server may be updated to support additional error codes that may be returned by the example ENUM server 130 when a communication session is rejected, and/or may include an error handler and/or additional error filtering criteria that forward a rejected communication session to a call rejection handler. However, such modifications and/or enhancements need not be present to support and/or implement the example methods and/or apparatus described herein. Example call rejection handlers include, but are not limited to, any type of announcement server and/or any type of voicemail server.

To provide an access entry point for an IMS device 105, 106 into the IMS network 115, the example IMS network 115 of FIG. 1 includes any number and/or type(s) of proxy call session control function (P-CSCF) servers, two of which are designated in FIG. 1 with reference numerals 140 and 141. The example P-CSCF servers 140 and 141 of FIG. 1, among other things, route SIP messages between IMS devices 105 and 106 and their associated S-CSCF servers 125 and 126.

To locate and/or identify the S-CSCF server 125, 126 associated with an IMS device 105, 106, the example IMS network 115 of FIG. 1 includes any number and/or type(s) of interrogating call session control function (I-CSCF) servers, one of which is designated in FIG. 1 with reference number 145. The example I-CSCF server 145 of FIG. 1 serves as a contact point within the example IMS network 115 for connections destined for an IMS device 105, 106 of the IMS communication system, and/or for an IMS device 105, 106 currently located within the serving area of the IMS communication system (e.g., a roaming subscriber). For example, for an incoming communication session (e.g., a telephone call) directed to an IMS device 105, 106, the example I-CSCF 145 identifies the S-CSCF server 125, 126 to which the destination IMS device 105, 106 is registered (e.g., the I-CSCF 145 queries an HSS (not shown) using a DIAMETER interface). Based upon the terminating S-CSCF server 126 identified by the I-CSCF 145, the originating S-CSCF 125 for the communication session routes IMS protocol messages between the IMS device 105, 105 and the terminating S-CSCF server 126.

To process and/or handle communication service data between any or all of the example IMS devices 105 and 106, and a public land mobile network (PLMN) 150 (e.g., a cellular communication network) and/or a public switched telephone network (PSTN) 155, the example IMS network 115 of FIG. 1 includes any number and/or type(s) of media gateways, one of which is designated in FIG. 1 with reference number 160. Using any number and/or type(s) of technique(s), method(s) and/or algorithm(s), the example media gateway 160 of FIG. 1 performs any appropriate media data conversion(s) between, for example, a circuit-based transmission format used by the PSTN 155 and a packet-based format and/or data structure used by any or all of the PLMN 150, the IMS network 115, the IP networks 120, 121, and/or the IMS devices 105 and 106.

To control the example media gateway 160, the example IMS network 115 of FIG. 1 includes any number and/or type(s) of MGCF servers, one of which is designated in FIG. 1 with reference number 165. Using any number and/or type(s) of technique(s), method(s) and/or in accordance with any past, present and/or future specification(s) and/or standard(s) such as, for example, Internet Engineering Task Force (IETF) Request for Comment (RFC) 3015 and/or the International Telecommunications Union (ITU) H.248 standard, the example MGCF server 165 of FIG. 1 performs signaling, session control and/or session management for incoming and/or outgoing IMS communication sessions that originate in and/or terminate in, for example, the example PLMN 150 and/or the example PSTN 155.

To select the network (e.g., the PLMN 150, the PSTN 155, etc.) over which a communication session directed to a non-IMS destination (e.g., a POTS telephone) is to be routed, the example IMS network 115 of FIG. 1 includes any number and/or type(s) of breakout gateway control function (BGCF) severs, one of which is designated at reference numeral 170. If an IMS session is directed to a non-IMS destination, the example BGCF 170 of FIG. 1 selects the MGCF server 165 that will be responsible for inter-working with the non-IMS network (e.g., the PLMN 150, the PSTN 155, etc.). The example BGCF server 170 also provides and/or routes the SIP signaling for the communication session to the example MGCF server 165.

As illustrated in FIG. 1, the example IMS network 115 may include an interface to and/or contain a portion of the PLMN 150, an interface to and/or contain a portion of the PSTN 155, and/or an interface to and/or contain a portion of any number and/or type(s) of additional communication networks. For example, using any number and/or type(s) of technique(s), method(s), protocol(s) and/or technology(-ies), the example BGCF server 170, the example MGCF server 165, the example media gateway 160 and the PSTN 155 can facilitate telephone calls and/or data communication between a PSTN-based phone (not shown) and one or more of the example IMS devices 105 and 106.

The example PLMN 150 and/or the example PSTN 155 of FIG. 1 may be implemented by any number and/or type(s) of communication devices, switches, protocols, systems and/or technologies. For instance, the example PLMN 150 may include any number of cellular base stations that can transmit cellular signals to and/or receive cellular signals from a cellular communication device (not shown) using any type(s) of protocols (e.g., time-division multiple access (TDMA), code-division multiple access (CDMA), orthogonal frequency-division multiple access (OFDM), Global System for Mobile Communications (GSM), etc.). In some examples, an interface between the media gateway 160 and the PLMN 150 is implemented via the PSTN 155.

To provide one or more additional call features, the example IMS network 115 of FIG. 1 includes any number and/or type(s) of application servers, two of which are designated in FIG. 1 with reference numerals 175 and 176. The example application servers 175 and 176 of FIG. 1 provide and/or implement additional service features to subscribers (e.g., voicemail, announcement servers, call trees, etc.). As illustrated in FIG. 1, for a particular communication session, the example application servers 175 and 176 may be associated and/or utilized by the originating S-CSCF server 125 and/or the terminating S-CSCF server 126. That is, the application servers 175 and 176 may be used to provide additional service features to one or both calling and/or called parties.

While an example IMS communication system, example IMS devices 105 and 106, and an example IMS network 115 have been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example S-CSCF servers 125 and 126, the example ENUM server 130, the example UCCS 135, the example P-CSCF servers 140 and 141, the example I-CSCF server 145, the example media gateway 160, the example MGCF server 165, the example BGCF server 170, and/or the example application servers 175 and 176 illustrated in FIG. 1 are logical entities of the example IMS network 115. They may, therefore, be implemented separately and/or in any combination using, for example, machine accessible instructions executed by one or more computing devices and/or computing platforms. Further, the example IMS devices 105 and 106, the example S-CSCF servers 125, the example ENUM server 130, the example UCCS 135, the example P-CSCF servers 140 and 141, the example I-CSCF server 145, the example media gateway 160, the example MGCF server 165, the example BGCF server 170, the example application servers 175 and 176 and/or, more generally, the example IMS network 115 may be implemented by hardware, software, firmware and/ or any combination of hardware, software and/or firmware. Further still, the example IMS communication system, the example IMS devices 105 and 106 and/or the example IMS network 115 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/ or processors. For example, an IMS network 115 may include any number and/or type(s) of home subscriber servers (HSSs) and/or session border controllers.

Figure 2:
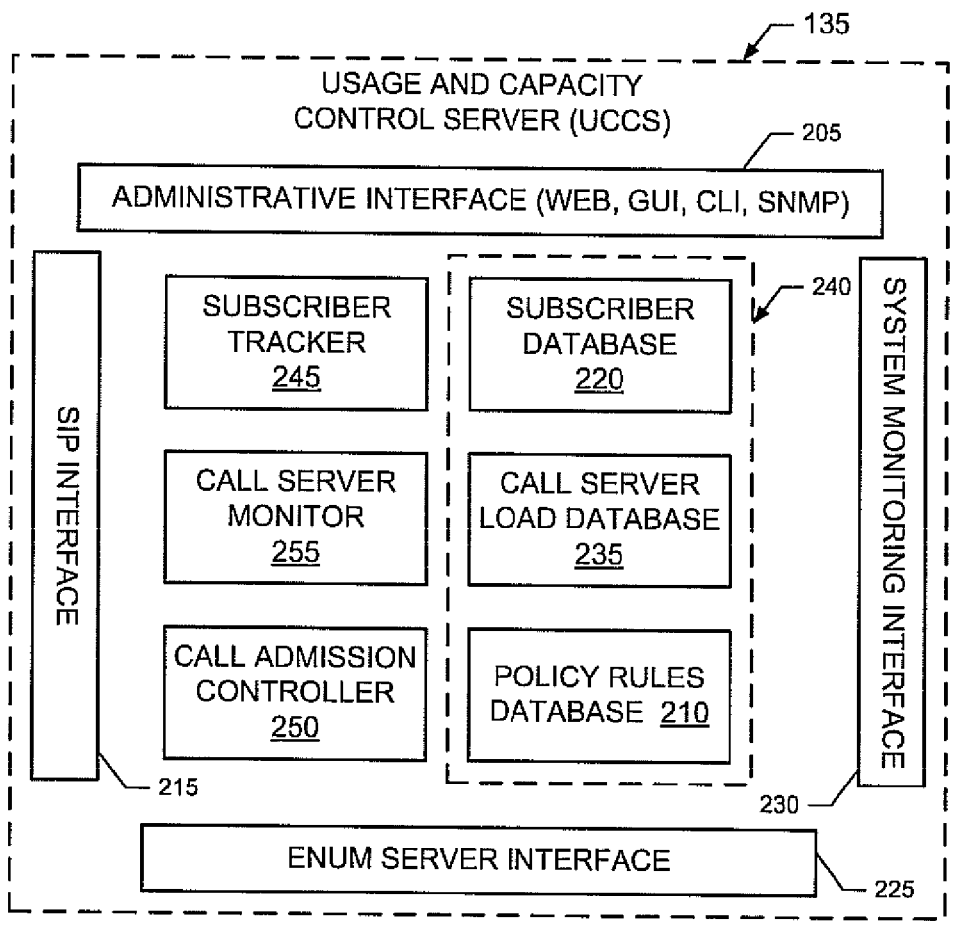
FIG. 2 illustrates an example manner of implementing the example usage and capacity control server (UCCS) of FIG. 1.

FIG. 2 illustrates an example manner of implementing the example UCCS 135 of FIG. 1. To allow the example UCCS 135 of FIG. 2 to be administered, the example UCCS 135 includes any type of administrative interface 205. The example administrative interface 205 of FIG. 2 may be implemented using one or more of a command-line interface (CLI), a graphical user interface (GUI), a web-based interface, a simple network management protocol (SNMP) interface, and/or an open application programming interface (API) such as, for example, JAVA or common object request broker architecture (CORBA). The example administrative interface 205 may be used to remotely administer and/or configure the example UCCS 135. For example, the administrative interface 205 may be used to configure and/or load policy rules 210 used by a call admission controller 250 to perform call admission control.

To allow the example UCCS 135 of FIG. 2 to operate as a SIP application server, the example UCCS 135 includes a SIP interface 215. The example SIP interface 215 of FIG. 2 allows a SIP registrar (e.g., any of the example S-CSCF servers 125, 126) to notify the UCCS 135 via a SIP message when an IMS device 105, 106 has been registered to the IMS network 115. Such notifications are used by the UCCS 135 to, for example, update subscriber data 220 so that the UCCS 135 can determine which S-CSCF server 125, 126 is associated with the IMS device 105, 106.

To interact with an ENUM server (e.g., the example ENUM server 130 of FIG. 1), the example UCCS 135 of FIG. 2 includes an ENUM server interface 225. The example ENUM server interface 225 of FIG. 2 is used to receive call admission control inquiry messages from the ENUM server and to provide call admission response messages to the ENUM server and may be implemented using any suitable protocol(s), message(s), frame(s) and/or logic.

To monitor call servers (e.g., any of the example S-CSCF servers 125 and 126, and/or the example MGCF 165 of FIG. 1), the example UCCS 135 of FIG. 2 includes a system monitoring interface 230. The example system monitoring interface 230 of FIG. 2 enables call servers to periodically and/or aperiodically provide the UCCS 135 with information and/or data concerning their current condition, workload (e.g., processor loading and/or memory usage) and/or current utilization of their associated communication resources. The example system monitoring interface 230 may, additionally or alternatively, be used to periodically and/or aperiodically query or poll the call servers for their current condition, workload and/or current communication resource utilization information and/or data. Data received via the system monitoring interface 230 is used to update call server load data 235.

The example policy rules 210, the example subscriber data 220 and the example call server load data 235 may be implemented using any number and/or type(s) of data structures, and may be stored in any number and/or type(s) of memories and/or memory devices 240. An example data structure that may be used to implement the example subscriber database 220 of FIG. 2 is described below in connection with FIG. 3. For each supported call server, the example call server load database 235 stores one or more values that represent its historical and/or current condition, workload and/or its historical and/or current communication resource condition and/or utilization. The example policy rules database 210 of FIG. 2 stores, one or more values (e.g., thresholds and/or weights for one or more call gapping factors) and/or equations/mathematical expressions that can be used to make call admission control decisions.

To update and/or access the subscriber database 220, the example UCCS 135 of FIG. 2 includes a subscriber tracker 245. The example subscriber tracker 245 of FIG. 2 receives information (e.g., associating a subscriber with an S-CSCF server 125, 126) via the example SIP interface 215, and uses the received information to update the subscriber data 220. The example subscriber tracker 245 can also be used by, for example, the example call admission controller 250, to identify the terminating S-CSCF server 125, 126 for a requested communication session based on data from the subscriber database 220. For example, as described below in connection with FIG. 3, the example subscriber tracker 245 may receive a telephone number and/or SIP URI for a called party, and may use the telephone number and/or SIP URI to query the subscriber database 220 to obtain and/or identify the terminating S-CSCF server 125, 126 for the called party, and/or to obtain other associated information, such as a MGCF server identifier, trunk group information, class-of-service information, etc. The example subscriber tracker 245 of FIG. 2 also manages a static routing/translation table for telephone numbers (e.g., similar to the table implemented in a BGCF server (e.g., the example BGCF server 170 of FIG. 1)), that allows call admission decisions to be made for calls placed to a non-IMS device (e.g., a PSTN-based telephone). The static routing/translation table may be, for example, imported from a BGCF server, an MGCF server, and/or may be created locally (e.g., via the example administrative interface 205) based on the North American numbering plan area (NPA) codes, prefix locations (NXX) and telephone number blocks.

To perform call admission control, the example UCCS 135 of FIG. 2 includes the example call admission controller 250. The example call admission controller 250 of FIG. 2 receives call admission request messages via the example ENUM server interface 225 and, based on data in the call server load database 235, makes call admission decisions for the requested communication sessions. The example call admission controller 250 may, for some conditions, admit a communication session request even though the terminating S-CSCF server 126 and/or its communication resources are overloaded. For example, the workload of the terminating S-CSCF server 126 may be ignored if one or both of the calling party and/or the called party has a sufficiently high class-of-service (i.e., a class-of-service exceeding a threshold). The example call admission controller 250 returns a call admission response message to the ENUM server via the ENUM server interface 225. Example machine accessible instructions that may be executed to implement the example call admission controller 250 and/or, more generally, the example UCCS 135 are described below in connection with FIGS. 10 and 11.

To update and/or access the call server load database 235, the example UCCS 135 of FIG. 2 includes a call server monitor 255. The example call server monitor 255 of FIG. 2 receives, queries for, polls for and/or otherwise obtains terminating call server workload and/or communication resource utilization information and/or data via the example system monitoring interface 230, and uses the obtained information and/or data to update the call server load data 235.

While an example manner of implementing the example UCCS 135 of FIG. 1 has been illustrated in FIG. 2, one or more of the interfaces, databases, elements, processes and/or devices illustrated in FIG. 2 may be combined, divided, re-arranged, omitted, eliminated and/or implemented in any other way. Further, the example interfaces 205, 215, 225 and 230, the example databases 210, 220 and 235, the example subscriber tracker 245, the example call admission controller 250, the example call server monitor 255 and/or, more generally, the example UCCS 135 may be implemented by hardware, software, firmware and/or any combination of hardware, software and/or firmware. Further still, the example UCCS 135 may include interfaces, databases, elements, processes and/or devices instead of, or in addition to, those illustrated in FIG. 2 and/or may include more than one of any or all of the illustrated interfaces, databases, elements, processes and/or devices.

Figure 3:
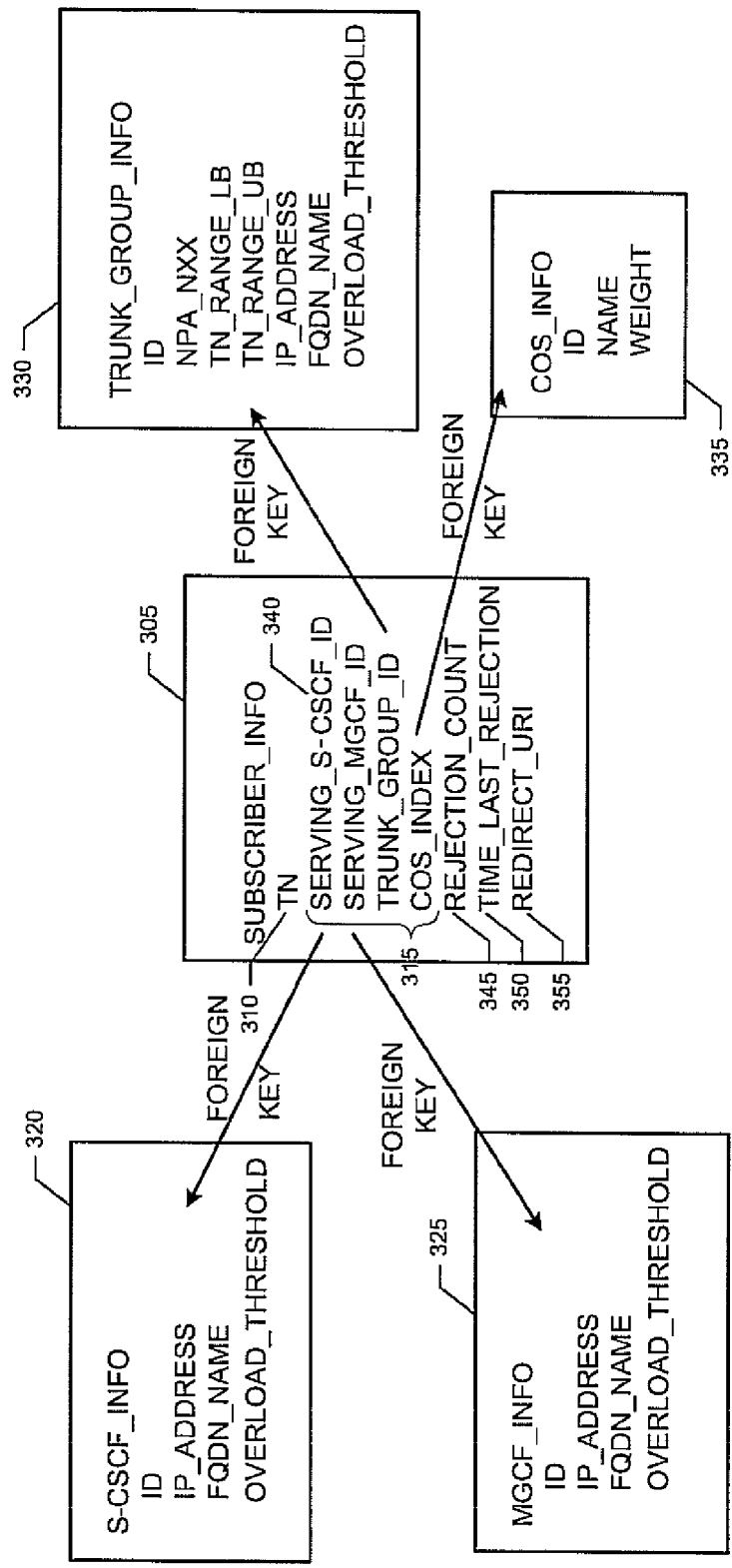
FIG. 3 illustrates an example data structure that may be used to implement the example subscriber data of FIG. 2.

FIG. 3 illustrates an example data structure that may be used to implement the example subscriber database 220 of FIG. 2. The example data structure of FIG. 3 includes a respective entry 305 for each of a plurality of subscribers. To identify the subscriber, the example entry 305 of FIG. 3 includes a telephone number field 310. The example telephone number field 310 of FIG. 3 contains one or more numbers and/or alphanumeric characters that represent one or more subscribers. For example, the telephone number field 310 may contain an E.164 telephone number and/or a SIP URI, and/or represent a range and/or block of E.164 telephone numbers (e.g., 512-372-xxxx). An entry 305 corresponding to a subscriber may be identified by comparing the telephone number and/or SIP URI received in a call admission control inquiry message with the contents of the telephone number field 310.

To identify call servers associated with the subscriber, the example entry 305 of FIG. 3 contains one or more fields 315. The example fields 315 of FIG. 3 contains values and/or entries that point and/or refer to respective data structures 320, 325, 330 and 335. Once an entry 305 is identified for a called subscriber, one or more of the example fields 315 may be utilized to identify the terminating call server and/or communication resources associated with the called subscriber. For example, for an IMS subscriber, the contents of a SERVING_S-CSCF_ID field 340 may be used to obtain information regarding the terminating call server associated with the IMS subscriber (e.g., to identify a particular data structure 320). The obtained information may then be used to obtain condition and/or workload information for the terminating call server from, for example, the example call server load database 235 of FIG. 2, so that a call admission decision may be made. Likewise, the entry 305 may be used to obtain information 325 regarding a MGCF server associated with the called number, to obtain information 330 regarding communication resources (e.g., a trunk group) used to provide communication services to the called number, and/or to obtain class-of-service information 335 for the called number. For example, the entry 305 together with the MGCF information 325 and 330 may be used to implement a call gapping policy for trunk groups from IMS/VoIP network to PSTN and/or PLMN connectivity. Persons of ordinary skill in the art will readily recognize that one or more of the fields 315 may be blank and/or contain NULL values. For example, for a non-IMS called party, the SERVING_S-CSCF_ID field 340 will not be used as there is no S-CSCF server associated with the non-IMS called party.

To track and/or record communication session rejections for the called subscriber, the example entry 305 of FIG. 3 includes a rejection count field 345 and a time of last rejection field 350. The example rejection count field 345 of FIG. 3 includes a numeric value that represents the number of call admission rejections for the called subscriber over a particular time period. The example time of last rejection field 350 of FIG. 3 includes one or more numbers and/or alphanumeric characters that represent the last time and/or last date that a communication session to the called subscriber was rejected.

To store a SIP URI for a call rejection handler, the example entry 305 of FIG. 3 includes a redirection URI field 355. The example redirection URI field 355 of FIG. 3 contains one or more numbers and/or alphanumeric characters that represent and/or identify a call rejection handler to handle call admission denials for the called subscriber. Example call rejection handlers include, but are not limited to, any type of announcement server and/or any type of voicemail server.

While an example data structure that may be used to implement the example subscriber database 220 of FIG. 2 is illustrated in FIG. 3, the example data structure of FIG. 3 may be implemented using any number and/or type(s) of other and/or additional entries, fields and/or data. Further, the entries, fields and/or data illustrated in FIG. 3 may be combined, divided, re-arranged, eliminated and/or implemented in any way. Moreover, the example data structure may include additional entries, fields and/or data than those illustrated in FIG. 3 and/or may include more than one of any or all of the illustrated entries, fields and/or data.

Figure 4:
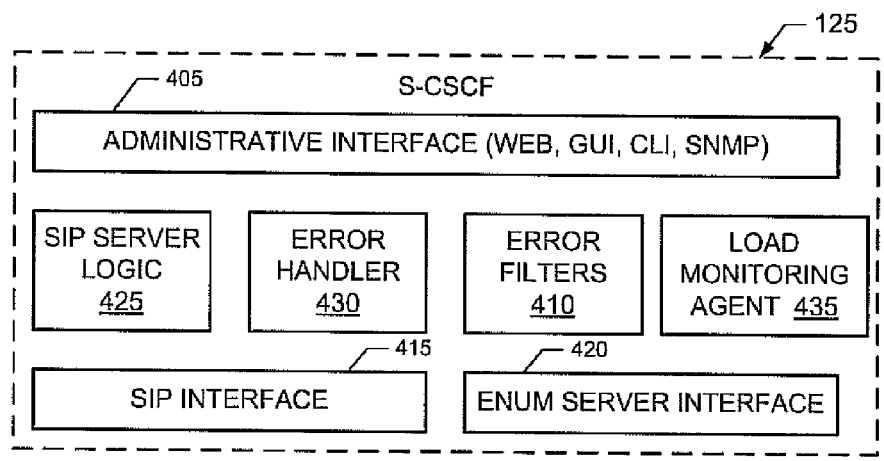
FIG. 4 illustrates an example manner of implementing any or all of the example serving call session control function (S-CSCF) servers of FIG. 1.

FIG. 4 illustrates an example manner of implementing any or all of the example S-CSCF servers 125 and 126 of FIG. 1. While any or all of the example S-CSCF servers 125 and 126 of FIG. 1 may be represented by the example device of FIG. 4, for ease of discussion the example device of FIG. 4 will be referred to simply as S-CSCF server 125. To allow the example S-CSCF server 125 of FIG. 4 to be administered, the example S-CSCF server 125 includes any type of administrative interface 405. The example administrative interface 405 of FIG. 4 may be implemented using one or more of a CLI, a GUI, a web-based interface, an SNMP interface, and/or an open application programming interface (API) such as, for example, JAVA or CORBA. The example administrative interface 405 may be used to remotely administer and/or configure the example S-CSCF server 125. For example, the administrative interface 405 may be used to configure and/or load error filters criteria and/or parameters 410. Error filter criteria and/or parameters 410 are commonly used by call servers to decide how and/or when to process and/or handle errors received by and/or generated at the S-CSCF server 125.

To allow the example S-CSCF server 125 of FIG. 4 to receive and/or send SIP messages, the example S-CSCF server 125 includes any type of SIP interface 415. The example SIP interface 415 of FIG. 4 allows the example S-CSCF server 125 to exchange one or more SIP messages with one or more other devices such as an IMS device, an I-CSCF server, an HSS, and/or any other call server.

To interact with an ENUM server (e.g., the example ENUM server 130 of FIG. 1), the example S-CSCF server 125 of FIG. 4 includes an ENUM server interface 420. The example ENUM server interface 420 of FIG. 4 is used to send an ENUM query message to an ENUM server and/or to receive an ENUM query response message from the ENUM server. An example ENUM server interface 420 is implemented in accordance with Internet Engineering Task Force (IETF) Request for Comment (RFC) 3761.

To process and/or handle SIP messages, the example S-CSCF 125 of FIG. 4 includes SIP server logic 425. The example SIP server logic 425 of FIG. 4 implements a state engine and/or maintains state information for SIP transactions, dialogs, and/or communication sessions including, for example, handling registrations and/or handling incoming/outgoing calls as defined in Internet Engineering Task Force (IETF) Request for Comment (RFC) 3261. For example, when a communication session request is received from a calling party at the S-CSCF 125, the example SIP server logic 425 performs an ENUM lookup for the called party by sending an ENUM query message to an ENUM server (e.g., the example ENUM server 130 of FIG. 1) via the example ENUM server interface 420. Example machine accessible instructions that may be executed to implement the example SIP server logic and/or, more generally, the example S-CSCF 125 to take advantage of ENUM servers capable of indicating call admission control decision are described below in connection with FIG. 8.

To handle errors, the example S-CSCF 125 of FIG. 4 includes an error handler 430. The example error handler 430 of FIG. 4 processes errors, error codes, response messages (e.g., call admission denial messages received from an ENUM server), and/or error messages received at and/or generated by the S-CSCF 125. For example, an ENUM server response message that indicates that a call is rejected may identify a call rejection handler (e.g., an announcement server and/or a voicemail server) to which the calling party is to be connected. Additionally or alternatively, the example error handler 430 handles received and/or generated errors based on the error filters 410. For example, an error can be compared with entries of the error filters 410 to identify if, how and/or when a particular error is to be processed and/or handled. An example error filter 410 defines that a call rejection for a communication session directed to a non-IMS device is forwarded to an announcement server, while a communication session directed to an IMS device is forward to a voicemail server.

To monitor the condition and/or workload of the example S-CSCF 125 of FIG. 4, the S-CSCF 125 includes a load monitoring agent 435. Using any method(s), algorithm(s) and/or logic, the example load monitoring agent 435 of FIG. 4 monitors the condition and/or workload of the S-CSCF 125 by, for example, monitoring processor condition, utilization(s), memory utilization(s), storage utilization(s) and/or utilization(s) of communication resources associated with the S-CSCF 125. The example load monitoring agent 435 periodically and/or aperiodically provides the condition and/or workload of the S-CSCF 125 to, for example, the example UCCS 135. Additionally or alternatively, the example load monitoring agent 435 may be periodically and/or aperiodically polled by the UCCS 135 for the condition and/or workload data and/or information.

While an example manner of implementing the example S-CSCF 125 of FIG. 1 has been illustrated in FIG. 4, one or more of the interfaces, data structures, elements, processes and/or devices illustrated in FIG. 4 may be combined, divided, re-arranged, omitted, eliminated and/or implemented in any other way. For example, the S-CSCF 125 may be implemented by modifying and/or enhancing a traditional and/or existing S-CSCF by the addition of one or more functions of the example error handler 430 and/or the example load monitoring agent 435. Further, the example interfaces 405, 415 and 420, the example error filters 410, the example SIP server logic 425, the example error handler 430, the example load monitoring agent and/or, more generally, the example S-CSCF 125 may be implemented by hardware, software, firmware and/or any combination of hardware, software and/or firmware. Further still, the example S-CSCF 125 may include interfaces, data structures, elements, processes and/or devices instead of, or in addition to, those illustrated in FIG. 4 and/or may include more than one of any or all of the illustrated interfaces, data structures, elements, processes and/or devices. For example, the S-CSCF 125 may include and/or implement one or more additional capabilities, interfaces and/or protocols in accordance with one or more past, present and/or future standards and/or specifications (e.g., a DIAMETER interface and/or protocol for interacting with a HSS). Such standards and/or specifications may be developed by organizations such as, for example, 3GPP, TISPAN and/or IETF.

Figure 5:
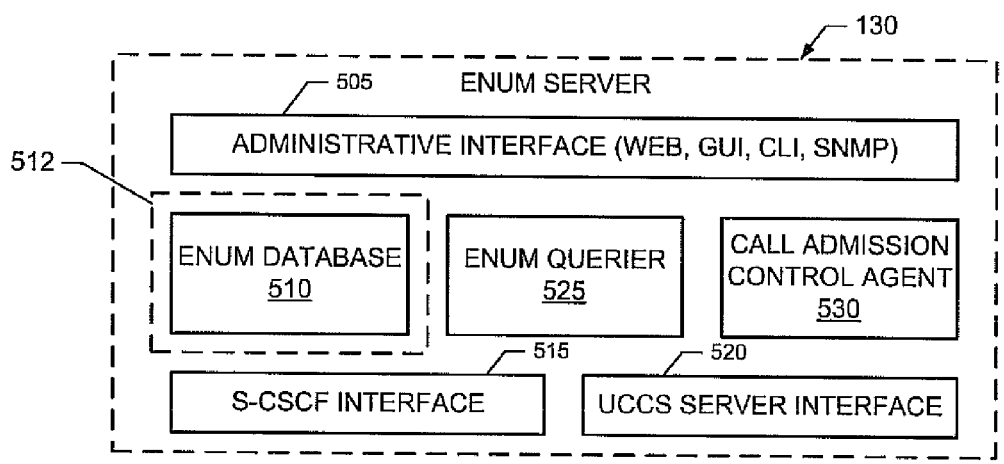
FIG. 5 illustrates an example manner of implementing the example tElephone NUMber mapping (ENUM) server of FIG. 1.

FIG. 5 illustrates an example manner of implementing the example ENUM server 130 of FIG. 1. To allow the example ENUM server 130 of FIG. 5 to be administered, the example ENUM server 130 includes any type of administrative interface 505. The example administrative interface 505 of FIG. 5 may be implemented using one or more of a CLI, a GUI, a web-based interface, an SNMP interface, and/or an open application programming interface (API) such as, for example, JAVA or CORBA. The example administrative interface 505 may be used to remotely administer and/or configure the example ENUM server 130. For example, the administrative interface 505 may be used to configure and/or load an ENUM database 510. The example ENUM database 510 of FIG. 5 stores associations of called party identifiers (e.g., E.164 telephone numbers) to SIP URIs. Thus, for example, by performing a lookup in the ENUM database 510, a SIP URI (e.g., an IP address) for a called device can be identified based upon a called telephone number. However, the ENUM database 510 may store any number and/or type(s) of associations between any number and/or type(s) of identifiers. The example ENUM database 510 of FIG. 5 may be implemented using any data structure(s) and may be stored in any number and/or type(s) of memories and/or memory devices 512. In some examples, the ENUM database 510 and/or the ENUM querier 525 are implemented using one or more legacy ENUM servers.

To allow the example ENUM server 130 of FIG. 5 to receive and/or respond to ENUM queries, the example ENUM server 130 includes any type of S-CSCF interface 515. The example S-CSCF interface 515 of FIG. 5 allows the example ENUM server 130 to receive ENUM lookup requests and to respond with a SIP URI and/or a call rejection message. The example S-CSCF interface 515 is implemented in accordance with IETF RFC 3761.

To interact with UCCS servers (e.g., the example UCCS 135 of FIG. 1), the example ENUM server 130 of FIG. 5 includes a UCCS server interface 520. The example UCCS server interface 520 of FIG. 5 is used to send call admission control inquiry messages to UCCS servers and to receive call admission response messages from the UCCS servers.

To perform ENUM lookups, the example ENUM server 130 of FIG. 5 includes an ENUM querier 525. The example ENUM querier 525 of FIG. 5 receives an ENUM lookup request message via the example S-CSCF interface 515 and performs a lookup for the called party in the ENUM database 510. The example ENUM querier 525 forwards the results of the ENUM lookup to call admission control agent 530.

To perform call admission control, the example ENUM server 130 of FIG. 5 includes the example call admission control agent 530. When the example ENUM querier 525 provides the results of an ENUM lookup, the example call admission control agent 530 generates and/or sends a call admission control inquiry message to a UCCS server (i.e., consults with the UCCS server) via the example UCCS server interface 520 to determine whether the requested communication session to the called party should be admitted. When the call admission control agent 530 receives a call admission response from the UCCS server via the UCCS server interface 520, the call admission control agent 530 forwards the corresponding response to the originating call server via the S-CSCF interface 515. For example, if the UCCS determines that the communication session is to be admitted, the call admission control agent 530 returns to the originating S-CSCF server 125 the SIP URI obtained by the ENUM querier 525 from the ENUM database query. If the communication session to the called party is to be rejected (i.e., not admitted), the call admission control agent 530 instead returns an error and/or call rejection message (e.g., a SIP 480 Temporarily Unavailable message). Example machine accessible instructions that may be executed to implement the example call admission control agent and/or, more generally, the example ENUM server 130 are described below in connection with FIG. 9.

While an example manner of implementing the example ENUM server 130 of FIG. 1 has been illustrated in FIG. 5, one or more of the interfaces, data structures, elements, processes and/or devices illustrated in FIG. 5 may be combined, divided, re-arranged, omitted, eliminated and/or implemented in any other way. Further, the example interfaces 505, 515 and 520, the example ENUM database 510, the example ENUM querier 525, the example call admission control agent 530 and/or, more generally, the example ENUM server 130 may be implemented by hardware, software, firmware and/or any combination of hardware, software and/or firmware. Further still, the example ENUM server 130 may include interfaces, data structures, elements, processes and/or devices instead of, or in addition to, those illustrated in FIG. 5 and/or may include more than one of any or all of the illustrated interfaces, data structures, elements, processes and/or devices.

Figure 6:
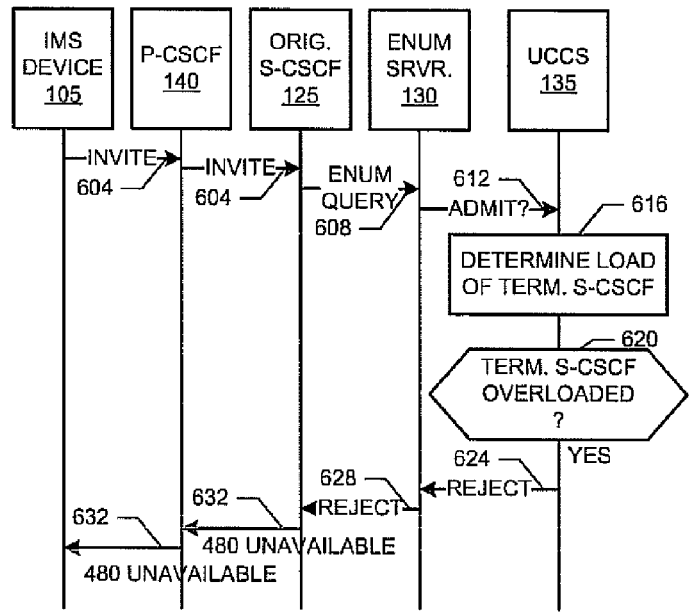
FIGS. 6 and 7 illustrates example protocol message exchanges and flowcharts representative of machine accessible instructions that may be executed to implement any or all of the example S-CSCF servers, the example ENUM server, the example UCCS and/or, more generally, the example IMS network of FIGS. 1, 2, 4 and/or 5.
Figure 7:
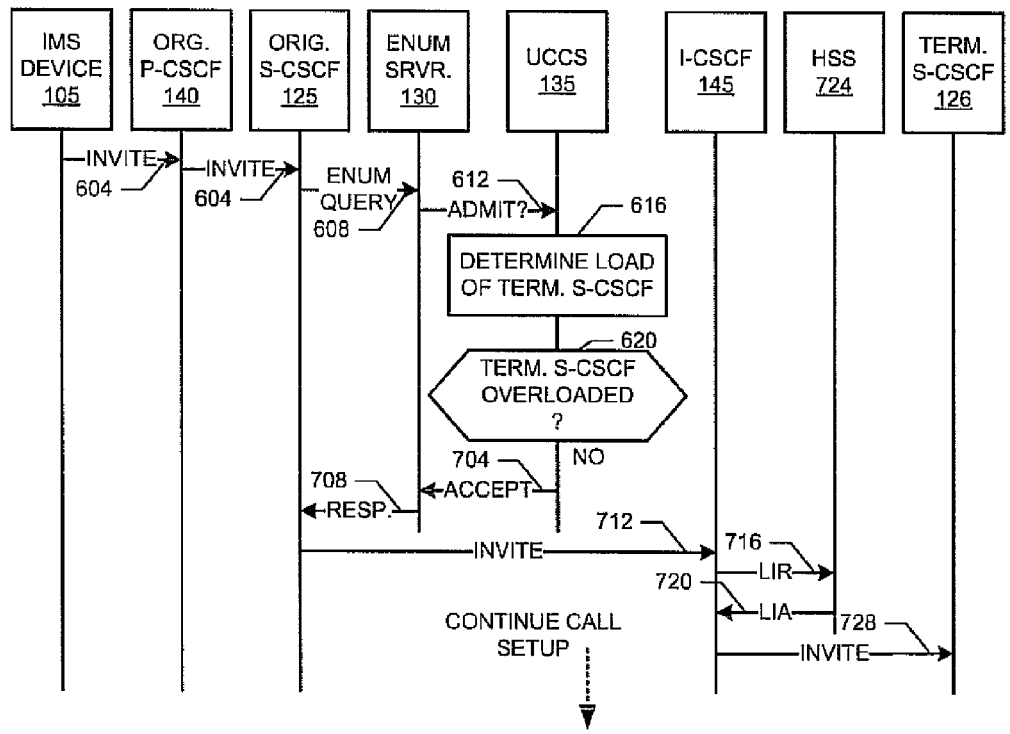

FIGS. 6 and 7 illustrate example protocol message exchanges, and flowcharts representative of machine accessible instructions that may be executed to implement the example S-CSCF servers 125 and 126, the example ENUM server 130, the example UCCS 135 and/or, more generally, the example IMS network 115 of FIGS. 1-5. The example exchanges and/or the example machine accessible instructions of FIGS. 6 and/or 7 may be carried out by a processor, a controller and/or any other suitable processing device. For example, the example exchanges and/or the example machine accessible instructions of FIGS. 6 and/or 7 may be embodied in coded instructions stored on a tangible medium such as a flash memory, a read-only memory (ROM) and/or random-access memory (RAM) associated with a processor (e.g., the example processor 1205 discussed below in connection with FIG. 12). Alternatively, some or all of the example exchanges and/or the example machine accessible instructions of FIGS. 6 and/or 7 may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIGS. 6 and/or 7 may be implemented manually or as any combination(s) of any of the foregoing techniques, for example, any combination of firmware, software, discrete logic and/or hardware. Persons of ordinary skill in the art will readily appreciate that many other methods of implementing the example S-CSCF servers 125 and 126, the example ENUM server 130, the example UCCS 135 and/or, more generally, the example IMS network 115 may be employed. For example, the order of execution of the blocks of the example flowcharts and/or the example exchanges of FIGS. 6 and/or 7 may be changed, and/or some of the blocks described may be changed, eliminated, sub-divided, and/or combined. Additionally, persons of ordinary skill in the art will appreciate that any or all of the example exchanges and/or the example machine accessible instructions of FIGS. 6 and/or 7 may be carried out sequentially and/or carried out in parallel by, for example, separate processing threads, processors, devices, discrete logic, circuits, etc.

The illustrated example of FIG. 6 begins with a calling IMS device 105 sending a SIP INVITE message 604 to the IMS network 115. The SIP INVITE message 604 is received by the example P-CSCF 140 and forwarded to the originating S-CSCF server 125 associated with the calling IMS device 105. Based on the called party identified in the SIP INVITE message 604, the originating S-CSCF server 125 performs an ENUM query by sending an ENUM query request message 608 to the ENUM server 130.

The ENUM server 130 performs the requested ENUM query, and sends a call admission control inquiry message 612 to the UCCS 135. The UCCS 135 determines the condition and/or workload of the terminating S-CSCF server 126 and/or the utilization of communication resources associated with the terminating S-CSCF server 126 (block 616). In the illustrated example of FIG. 6, the UCCS 135 determines that the terminating S-CSCF server 126 and/or its associated communication resources are currently overloaded (block 620), and sends a call admission response message 624 that indicates that the call is rejected to the ENUM server 130.

The ENUM server 130 receives the call admission response message 624 and sends an appropriate call rejection message 628 to the originating S-CSCF 125. When the originating S-CSCF 125 receives the call rejection message 628, the originating S-CSCF 125 sends, for example, a SIP message 632 (e.g., a SIP 480 Temporarily Unavailable message) via the P-CSCF 140 to the calling IMS device 105.

FIG. 7 illustrate additional example protocol message exchanges, and flowcharts representative of machine accessible instructions that may be executed to implement the example S-CSCF servers 125 and 126, the example ENUM server 130, the example UCCS 135 and/or, more generally, the example IMS network 115 of FIGS. 1-5. Because the first portion of the illustrated example of FIG. 7 is substantially similar, analogous and/or identical to the first portion of the illustrated example of FIG. 6, the description of those blocks is not repeated here. Instead, the interested reader is referred back to the descriptions presented above in connection with FIG. 6 for a complete description of those like numbered elements. Like reference numerals are used for like blocks in FIGS. 6 and 7 to facilitate this process.

Picking up the description of FIG. 7 at block 620, in contrast to the example of FIG. 6, in the illustrated example of FIG. 7, the UCCS 135 determines that the terminating S-CSCF server 126 and/or its associated communication resources are not currently overloaded (block 620), and sends a call admission acceptance message 704 to the ENUM server 130. Because the UCCS 135 accepted the requested communication session, the example ENUM server 130 sends to the originating S-CSCF server 125 the SIP URI determined via the ENUM lookup in an ENUM query response message 708.

When the originating S-CSCF server 125 receives the SIP URI for the called party in the response message 708, the originating S-CSCF server 125 sends a SIP INVITE message 712 to the I-CSCF server 145. The I-CSCF 145 send a query 716 to and receives a response 720 from an HSS 724, and then sends a SIP INVITE message 728 to the terminating S-CSCF 126. Call setup for the requested communication session may then continue as is commonly performed in any desired fashion.

Figure 8:
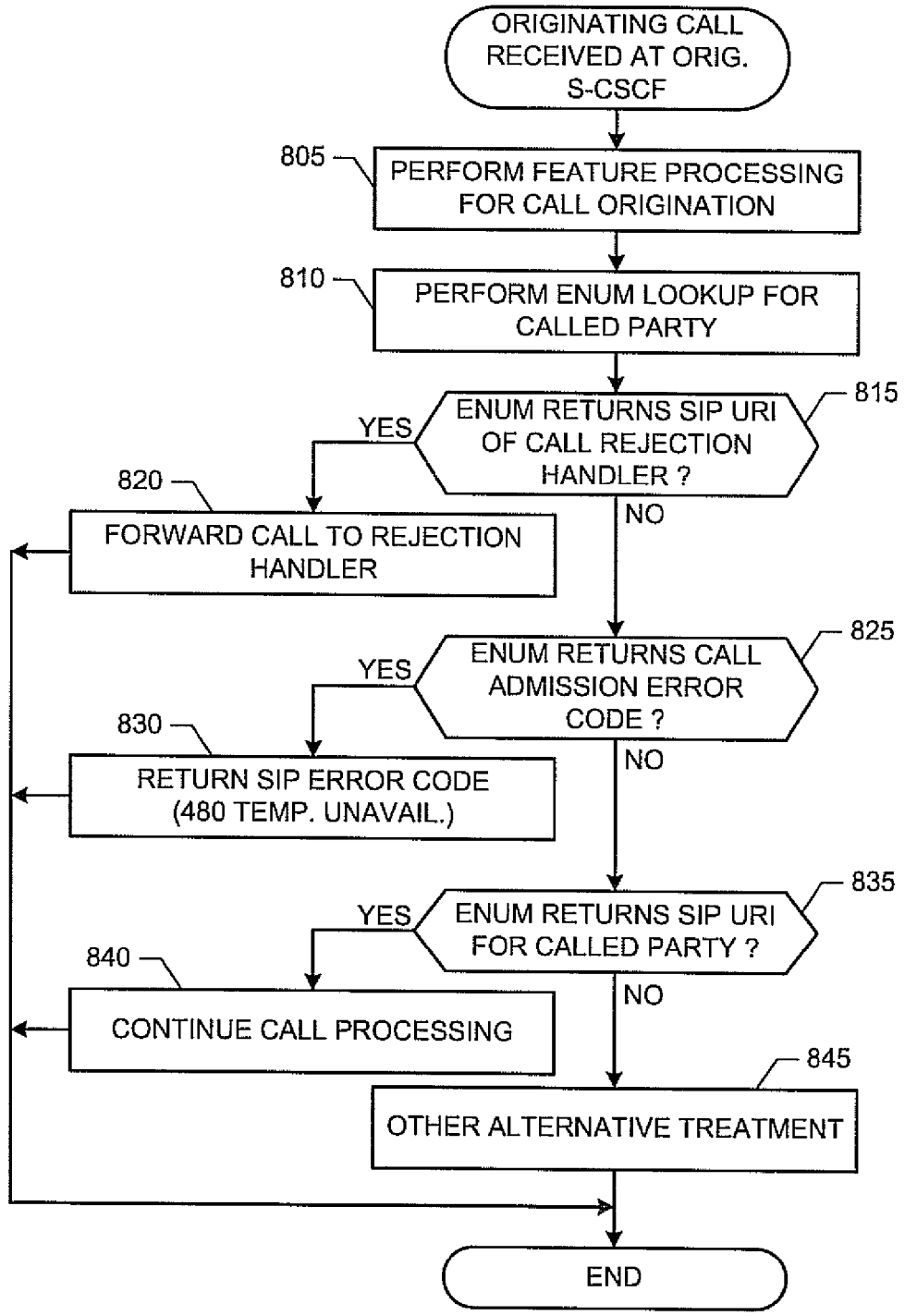
FIG. 8 illustrates example machine accessible instructions that may be executed to implement any or all of the example S-CSCF servers of FIGS. 1 and 4.
Figure 9:
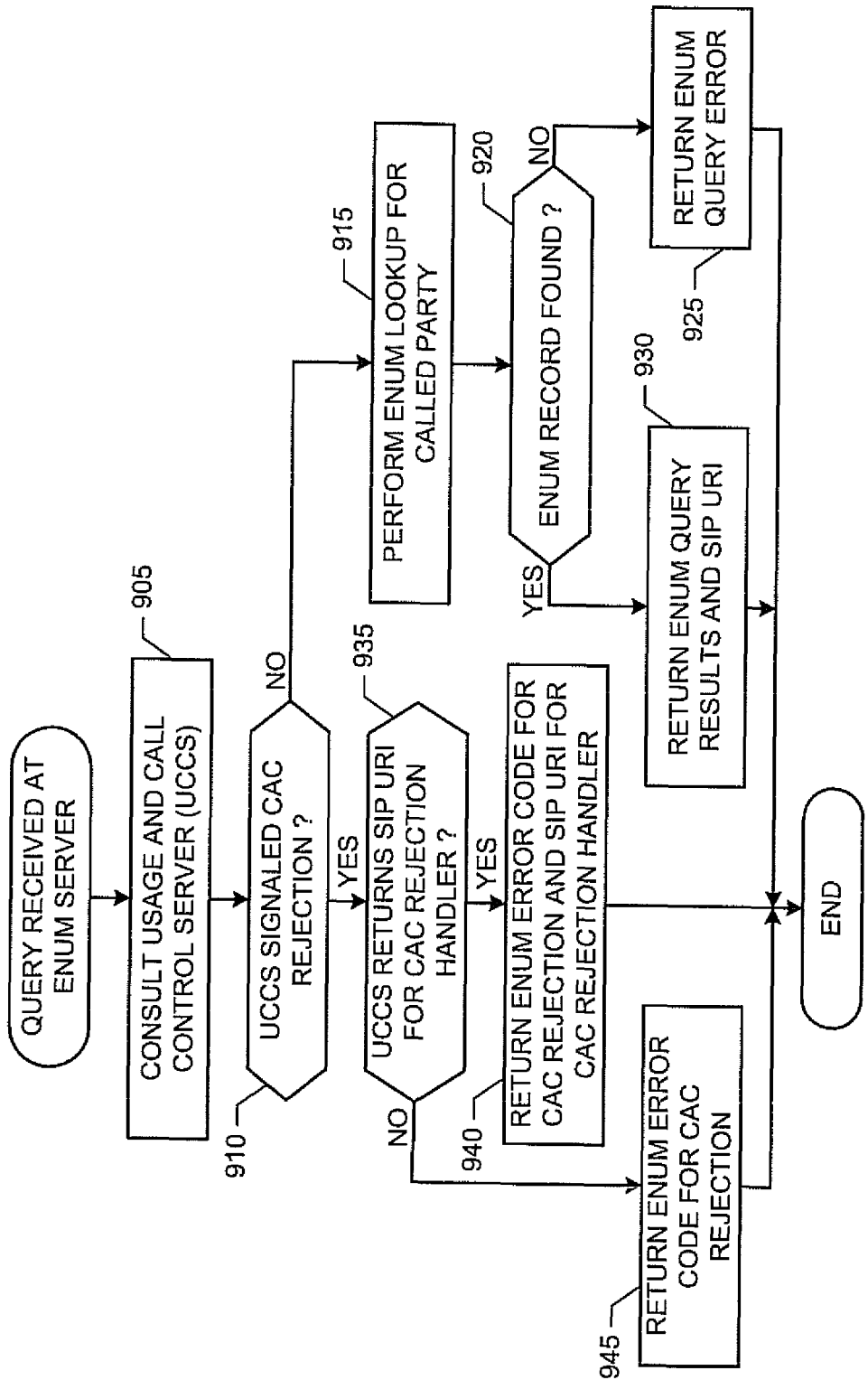
FIG. 9 illustrates example machine accessible instructions that may be executed to implement any or all of the example ENUM servers of FIGS. 1 and 5.
Figure 10:
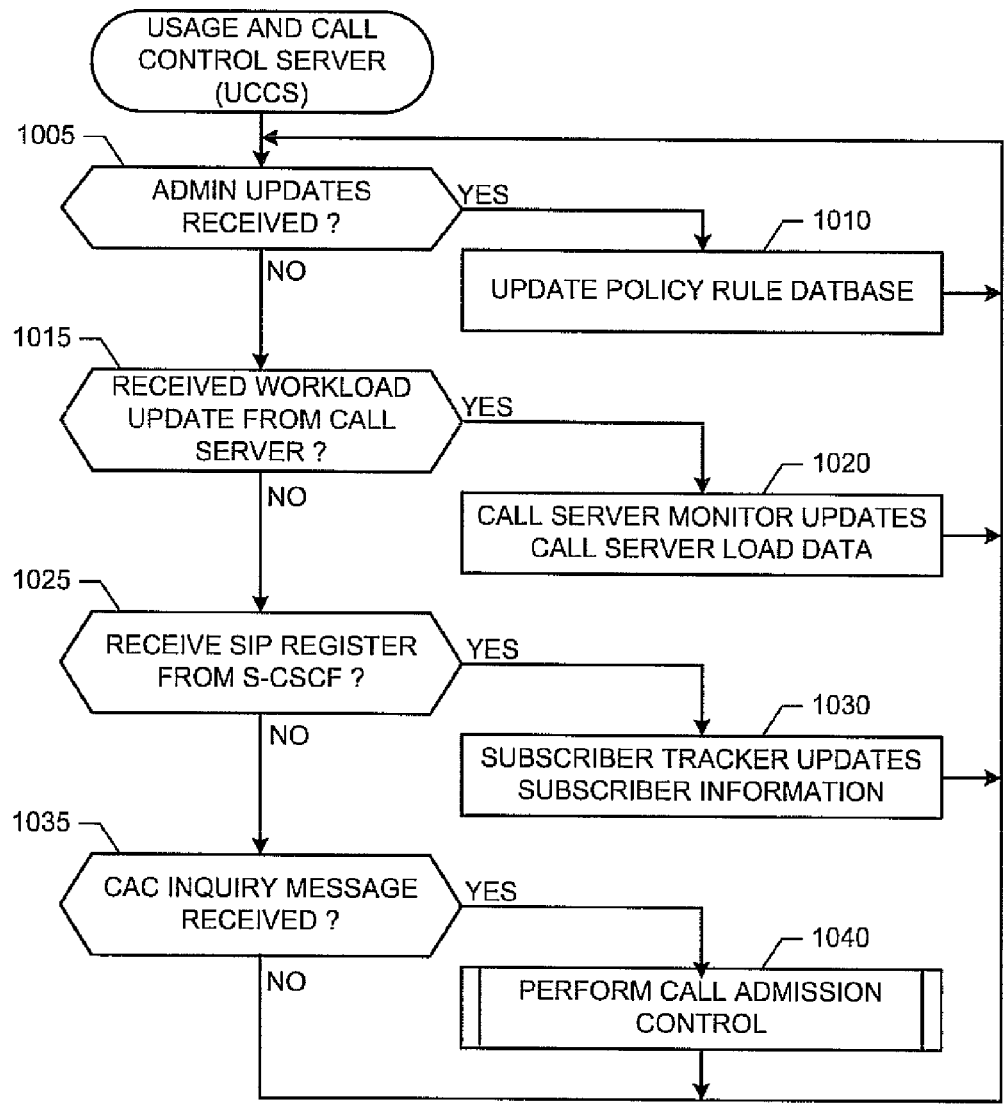
FIG. 10 illustrates example machine accessible instructions that may be executed to implement any or all of the example UCCSs of FIGS. 1 and 2.
Figure 11:
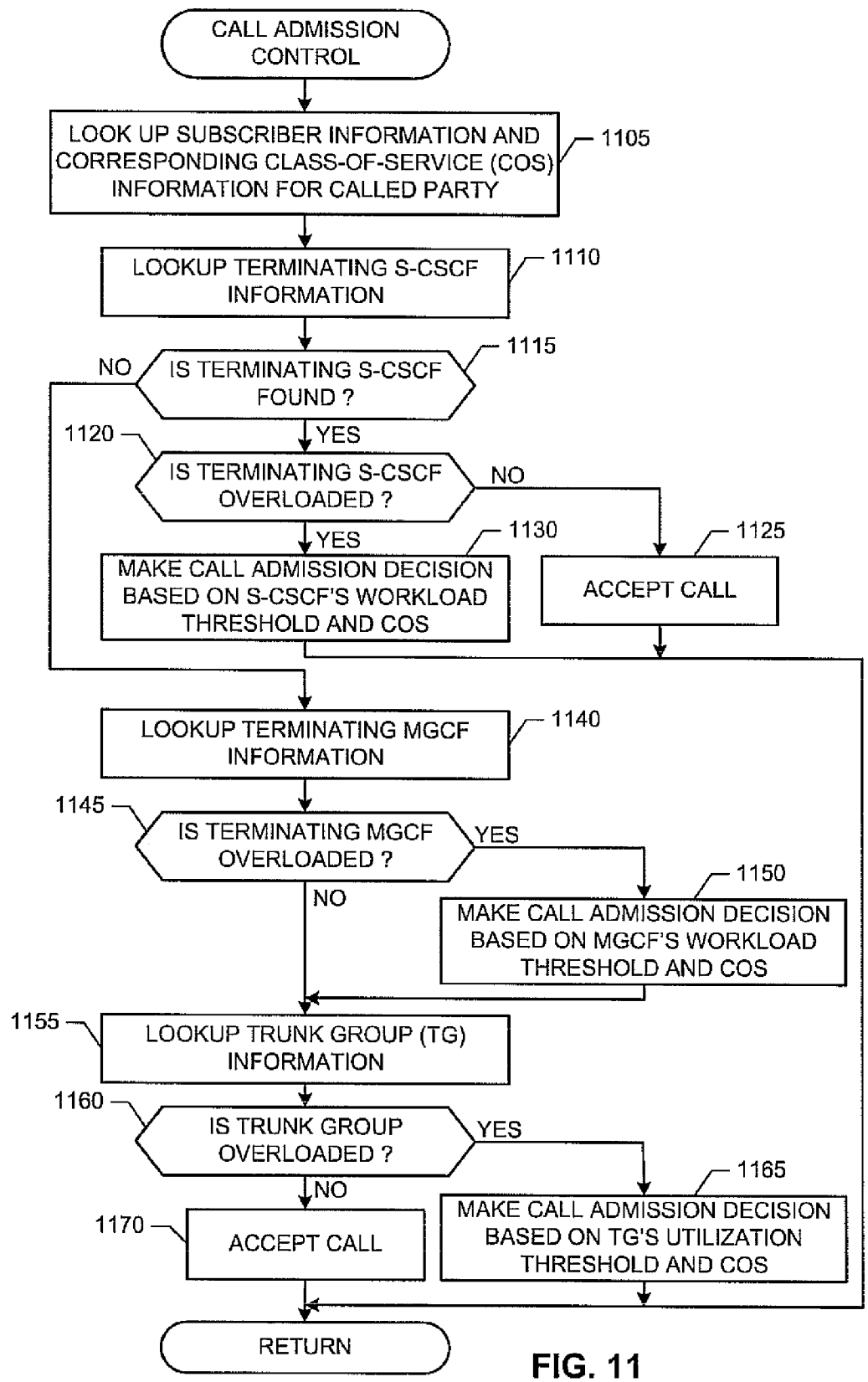
FIG. 11 illustrates example machine accessible instructions that may be executed to implement the example call admission controller of FIG. 2.

FIG. 8 illustrates example machine accessible instructions that may be executed to implement any or all of the example S-CSCF servers 125 and 126 of FIGS. 1 and 4. FIG. 9 illustrates example machine accessible instructions that may be executed to implement any or all of the example ENUM servers 130 of FIGS. 1 and 5. FIGS. 10 and 11 illustrate example machine accessible instructions that may be executed to implement any or all of the example UCCS 135 of FIGS. 1 and 2. The example machine accessible instructions of FIGS. 8, 9, 10 and/or 11 may be carried out by a processor, a controller and/or any other suitable processing device. For example, the example machine accessible instructions of FIGS. 8, 9, 10 and/or 11 may be embodied in coded instructions stored on a tangible medium such as a flash memory, a ROM and/or RAM associated with a processor (e.g., the example processor 1205 discussed below in connection with FIG. 12). Alternatively, some or all of the example machine accessible instructions of FIGS. 8, 9, 10 and/or 11 may be implemented using any combination(s) of ASIC(s), PLD(s), FPLD(s), discrete logic, hardware, firmware, etc. Also, some or all of the example machine accessible instructions of FIGS. 8, 9, 10 and/or 11 may be implemented manually or as any combination of any of the foregoing techniques, for example, as any combination of firmware, software, discrete logic and/or hardware. Further, although the example machine accessible instructions of FIGS. 8, 9, 10 and 11 are described with reference to the flowcharts of FIGS. 8, 9, 10 and 11, persons of ordinary skill in the art will readily appreciate that many other methods of implementing the machine accessible instructions of FIGS. 8, 9, 10 and/or 11 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 8, 9, 10 and/or 11 may be carried out sequentially and/or carried out in parallel by, for example, separate processing threads, processors, devices, discrete logic, circuits, etc.

The example machine accessible instructions of FIG. 8 begin when an originating communication session request is received by an originating S-CSCF server (e.g., any of the example S-CSCF servers 125 and 126 described herein). The originating S-CSCF server (e.g., the example SIP server logic 425 of FIG. 4) performs and/or initiates feature processing (if applicable) by, for example, initiating processing for the calling party by an application server (e.g., the example application server 175) (block 805). The SIP server logic then sends an ENUM query message to an ENUM server (block 810).

If the SIP server logic receives a call rejection response message and the response message identifies a SIP URI of a call rejection handler (block 815), an error handler (e.g., the example error handler 430 of FIG. 4) forwards the communication session to the identified call rejection handler (block 820). Control then exits from the example machine accessible instructions of FIG. 8.

If the SIP server logic receives a call rejection response message, but the response message does not identify a SIP URI of a call rejection handler (block 825), the error handler sends, for example, a SIP 480 Temporarily Unavailable message to the calling IMS device (block 830). For example, the error handler can process the error identified in the response message by, for example, comparing an error code contained in the response message with one or more error filters (e.g., the example error filters 410 of FIG. 4). Control then exits from the example machine accessible instructions of FIG. 8.

If the SIP server logic receives a SIP URI for the called party (block 835), the SIP server logic continues call processing for the requested communication sessions in any desired fashion (e.g., in a conventional fashion) (block 840). When call processing for the requested communication session has completed, control exits from the example machine accessible instructions of FIG. 8.

If the SIP server logic receives any other response and/or error code than those handled by blocks 820, 830 and/or 840 (e.g., SIP URI not found) (block 835), the SIP server logic performs appropriate alternative treatment for the communication session (block 845). For example, if the called party is associated with a PSTN telephone number (thus, having no associated SIP URI), the SIP server logics sends the communication session to a BGCF server (e.g., the example BGCF server 170 of FIG. 1) which routes the communication session to the appropriate MGCF server (e.g., the example MGCF server 165). Additionally or alternatively, the error handler can processes the error identified in the response message by, for example, comparing an error code contained in the response message with one or more error filters (e.g., the example error filters 410 of FIG. 4). When treatment of the returned error code is completed (block 845), control exits from the example machine accessible instructions of FIG. 8.

The example machine accessible instructions of FIG. 9 begin when an ENUM query message is received at an ENUM server (e.g., any of the example ENUM servers 130 described herein). The ENUM server (e.g., the example call admission control agent 530 of FIG. 5) sends a call admission control inquiry message to a UCCS (e.g., the example UCCS 135 described herein) (block 905). If the call admission control agent receives a response message indicating that the communication session is to be admitted (block 910), the ENUM server (e.g., the example ENUM querier 525) performs an ENUM lookup in an ENUM database (e.g., the example ENUM database 510) (block 915). If no ENUM record for the called party is located (block 920), the ENUM querier sends an ENUM query response message indicating that no SIP URI was identified for the calling party (block 930). Control then exits from the example machine accessible instructions of FIG. 9.

If an ENUM record is located (block 920), the ENUM server (e.g., the example call admission control agent 530 of FIG. 5) sends a response message to the originating S-CSCF server that contains the SIP URI previously identified by the ENUM querier (block 930). Control then exits from the example machine accessible instructions of FIG. 9.

Returning to block 910, if the call admission control agent receives a response indicating that the communication session is to be rejected (block 910), the call admission control agent determines whether the response message identified a call rejection handler (block 935). If the response message identified a call rejection handler (block 935), the call admission control agent sends a call rejection response message that identifies the call rejection handler to the originating S-CSCF (block 940). Control then exits from the example machine accessible instructions of FIG. 9.

If the rejection response message did not identified a call rejection handler (block 935), the call admission control agent sends a call rejection response message that does not identify the call rejection handler to the originating S-CSCF (block 945). Control then exits from the example machine accessible instructions of FIG. 9.

The example machine accessible instructions of FIG. 10 may be executed to implement the example UCCS 135 described herein. If administrative updates are received via, for example, the example administrative interface 205 of FIG. 2 (block 1005), the UCCS updates the policy rules 210, the MGCF information 325 (e.g., static routing/translation table information), and/or other configuration parameters of the UCCS (block 1010). Control then returns to block 1005 to check for administrative updates.

If administrative updates were not received (block 1005), the UCCS (e.g., the call server monitor 225 of FIG. 2) determines if updated call server condition and/or workload data and/or information was received and/or otherwise obtained (block 1015). If updated call server condition and/or workload data and/or information was received and/or otherwise obtained (block 1015), the call server monitor updates call server load data (e.g., in the example call server load database 235 of FIG. 2) (block 1020). Control then returns to block 1005 to check for administrative updates.

Returning to block 1015, if updated call server condition and/or workload data and/or information was not received (block 1015), the UCCS (e.g., the example subscriber tracker 245 of FIG. 2) determines if updated subscriber information was received (e.g., a SIP registration notification message, for example, SIP third party registration message) (block 1025). If updated subscriber information was received (block 1025), the subscriber tracker updates subscriber information (e.g., in the example subscriber database 220) (block 1030). Control then returns to block 1005 to check for administrative updates.

Returning to block 1055, if updated subscriber information was not received (block 1025), the UCCS (e.g., the example call admission controller 250 of FIG. 2) determines is a call admission control (CAC) inquiry message (e.g., the example CAC inquiry message 612 of FIG. 6) was received (block 1035). If a call admission control inquiry message was received (block 1035), the call admission controller makes a call admission decision by, for example, executing the example machine accessible instructions of FIG. 11 (block 1040). Control then returns to block 1005 to check for administrative updates. If a call admission control inquiry was not received (block 1035), then control returns to block 1005 to check for administrative updates.

The example machine accessible instructions of FIG. 11 may be executed to make a call admission decision and/or, more specifically, to implement the example call admission controller 250 of FIG. 2. The example machine accessible instructions of FIG. 11 begin when a call admission control inquiry message is received by a call admission controller (e.g., the example call admission controller 250) at, for example, block 1040 of FIG. 10. The call admission controller identifies the subscriber information for the called party (e.g., the example entry 305 of FIG. 3 associated with the called party) and obtains the corresponding class-of-service information (e.g., the example entry 335) for the called party (block 1105). The call admission controller then identifies the terminating S-CSCF server for the called party (if applicable) by, for example, using the contents of the example field 340) (block 1110).

If information for the terminating S-CSCF is found (block 1115) and if the terminating S-CSCF server is not overloaded (block 1120), the call is accepted (block 1125) and control exits from the example machine accessible instructions of FIG. 11 to, for example, the example machine accessible instructions of FIG. 10.

Returning to block 1120, if the terminating S-CSCF server is overloaded (e.g., the current workload of the terminating S-CSCF server is above a workload threshold) (block 1120), the call admission controller makes a call admission decision based upon the current workload of the terminating S-CSCF and the class-of-service for the called party (block 1130). For example, one or more of the following policy rules (e.g., from the example policy rules database 210) may be applied to make the call admission decision:
 if the class-of-service (COS) is below a class-of-service threshold, and the S-CSCF workload is above a first threshold, the call is rejected;
 if the class-of-service is above a class-of-service threshold, the call is admitted regardless of the workload;
 if the workload is above a second threshold, the call is rejected regardless of the class-of-service.
Control then exits from the example machine accessible instructions of FIG. 11 to, for example, the example machine accessible instructions of FIG. 10.

Returning to block 1115, if information for the terminating S-CSCF is not found (block 1115), control continues to block 1140 without making a call admission decision based on the current workload of the terminating S-CSCF. The call admission controller obtains (if applicable) information regarding a terminating MGCF server associated with the called party (e.g., the example MGCF server 165 of FIG. 1) (block 1140). If there is an applicable terminating MGCF server for the requested communication session and the MGCF server is overloaded (block 1145), the call admission controller makes a call admission decision based upon the current workload of the MGCF server and the class-of-service (block 1150), and control proceeds to block 1155. For example, one or more of the following policy rules (e.g., from the example policy rules database 210) may be applied to make the call admission decision:
 if the class-of-service is below a class-of-service threshold, and the MGCF server workload is above a third threshold, the call is rejected;
 if the class-of-service is above a class-of-service threshold the call is admitted regardless of the workload;
 if the workload is above a fourth threshold, the call is rejected regardless of the class-of-service.

Returning to block 1145, if the terminating MGCF server is not overloaded (block 1145), control proceeds to block 1155 without making a call admission decision based on the current workload of the MGCF server. The call admission controller obtains (if applicable) information regarding a trunk group for the communication session (block 1155). If there is an applicable trunk group for the requested communication session and the trunk group is overloaded (block 1160), the call admission controller makes a call admission decision based upon the current utilization of the trunk group and the class-of-service (block 1165). Control then returns from the example machine accessible instructions of FIG. 11 to, for example, the example machine accessible instructions of FIG. 10. For example, one or more of the following policy rules (e.g., from the example policy rules database 210) may be applied to make the call admission decision:
 if the class-of-service is below a class-of-service threshold, and the trunk group utilization is above a fifth threshold, the call is rejected;
 if the class-of-service is above a class-of-service threshold, the call is admitted regardless of the trunk group utilization;
 if the trunk group utilization is above a sixth threshold, the call is rejected regardless of the class-of-service.
Persons of ordinary skill in the art will readily appreciate that the thresholds used at blocks 1125, 1150 and 1165 to make call admission decisions are generally different. However, one or more of the threshold may be the same.

Returning to block 1160, if the trunk group is not overloaded (block 1160) and the call has not been rejected at block 1150, the request call is admitted (block 1170). Control then returns from the example machine accessible instructions of FIG. 11 to, for example, the example machine accessible instructions of FIG. 10.

Figure 12:
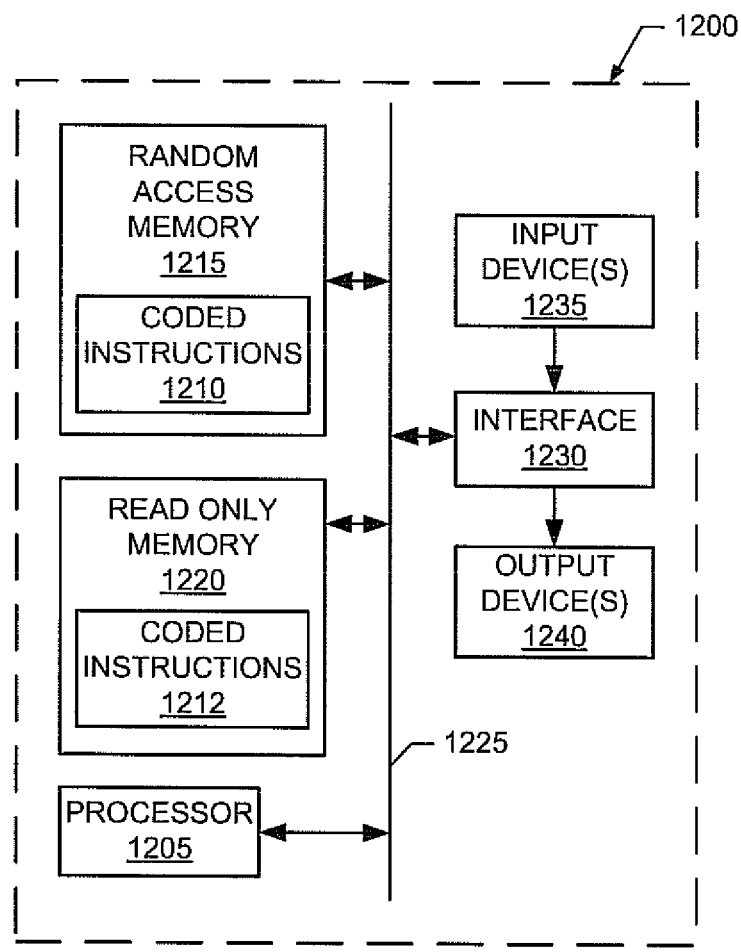
FIG. 12 is a schematic illustration of an example processor platform that may be used and/or programmed to carry out the example message exchanges and/or the example machine accessible instructions of FIGS. 6, 7, 8, 9, 10 and/or 11 to implement any of all of the example methods and apparatus described herein.

FIG. 12 is a schematic diagram of an example processor platform 1200 that may be used and/or programmed to implement all or a portion of any or all of the example S-CSCF servers 125 and 126, the example ENUM server 130, the example UCCS 135, the example P-CSCF servers 140 and 141, the example I-CSCF server 145, the example media gateway 160, the example MGCF server 165, the example BGCF server 170, and/or the example application servers 175 and 175 of FIGS. 1-5. For example, the processor platform 1200 can be implemented by one or more general purpose processors, processor cores, microcontrollers, etc.

The processor platform 1200 of the example of FIG. 12 includes at least one general purpose programmable processor 1205. The processor 1205 executes coded instructions 1210 and/or 1212 present in main memory of the processor 1205 (e.g., within a RAM 1215 and/or a ROM 1220). The processor 1205 may be any type of processing unit, such as a processor core, a processor and/or a microcontroller. The processor 1205 may execute, among other things, the example exchanges and/or the example machine accessible instructions of FIGS. 6-11 to implement the example methods and apparatus described herein.

The processor 1205 is in communication with the main memory (including a ROM 1220 and/or the RAM 1215) via a bus 1225. The RAM 1215 may be implemented by DRAM, SDRAM, and/or any other type of RAM device, and ROM may be implemented by flash memory and/or any other desired type of memory device. Access to the memory 1215 and 1220 may be controlled by a memory controller (not shown). The RAM 1215 may be used to store and/or implement, for example, the example policy rules database 210, the example subscriber database 220, the example call server load database 235, the example error filters 410 and/or the example ENUM database 510.

The processor platform 1200 also includes an interface circuit 1230. The interface circuit 1230 may be implemented by any type of interface standard, such as an external memory interface, serial port, general purpose input/output, etc. One or more input devices 1235 and one or more output devices 1240 are connected to the interface circuit 1230. The input devices 1235 and/or output devices 1240 may be used to, for example, implement the example interfaces 205, 215, 225 and 230 of FIG. 2, the example interfaces 405, 415 and 420 of FIG. 4, and/or the example interfaces 505, 515 and 520 of FIG. 5.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   identifying, with a tElephone NUMber mapping server, a terminating voice over Internet protocol call server associated with a called device, the terminating voice over Internet protocol call server having an associated uniform resource identifier determined by the tElephone NUMber mapping server, the uniform resource identifier to be included in a call initiation request message;
   determining, with the tElephone NUMber mapping server, an overload status of the terminating voice over Internet protocol server by:
      sending, from the tElephone NUMber mapping server, the call admission request message to a usage and capacity control server;
      receiving, at the tElephone NUMber mapping server, a call admission response message from the usage and capacity control server; and
      sending the call resection message instead of the uniform resource identifier from the tElephone NUMber mapping server in response to the overload status; and
   when the overload status of the terminating voice over Internet protocol call server indicates an overload condition, reducing a processing burden of the terminating voice over Internet protocol server by:
      (a) withholding the uniform resource identifier from being sent to the terminating voice over Internet protocol call server from an originating voice over Internet protocol server,
      (b) sending, from the tElephone NUMber mapping server a call rejection message to the originating voice over Internet protocol server; and
      (c) authorizing a call associated with the call initiation request message based on an overload status of a media gateway server associated with the terminating voice over Internet protocol server and a class-of-service weight associated with the called device.

2. A method as defined in claim 1, wherein the terminating voice over Internet protocol call server and the originating voice over Internet protocol call server are to facilitate a communication session between a calling device and the called device.

3. A method as defined in claim 1, wherein the call rejection message is returned irrespective of the overload status.

4. A method as defined in claim 1, further including receiving a call rejection indicator including an identifier for a call rejection handler.

5. A method as defined in claim 1, wherein the overload status indicates the terminating voice over Internet protocol call server has an insufficient resource to facilitate a communication session between the called device and a calling device.

6. A method as defined in claim 5, wherein the overload status indicates the called device has a class-of-service weight above a threshold value.

7. A method as defined in claim 1, wherein the overload status indicates a utilization of a communication path communicatively coupling the originating voice over Internet protocol call server and the terminating voice over Internet protocol call server exceeds a threshold.

8. A tElephone NUMber mapping server for an Internet protocol Multimedia Subsystem network, the server comprising:
    a memory including machine readable instructions; and
    a processor to execute the instructions to perform operations including:
        accessing a uniform resource identifier associated with a called device in response to a tElephone NUMber mapping query, the uniform resource identifier to be included in a call initiation request message;
        determining an overload status of a terminating call server associated with the called device by:
            sending the call admission request message to a usage and capacity control server;
            receiving a call admission response message from the usage and capacity control server; and
            sending the call resection message instead of the uniform resource identifier in response to the overload status; and
        when the overload status of the terminating server indicates an overload condition, reducing a processing burden of the terminating call server by:
            (a) not sending the uniform resource identifier from an originating call server to the terminating call server;
            (b) sending a call rejection message to the originating call server; and
            (c) authorizing a call associated with the call initiation request message based on an overload status of a media gateway server associated with the terminating call server and a class-of-service weight associated with the called device.

9. A server as defined in claim 8, wherein the overload status of the terminating call server indicates a state of at least one of a processing resource, a communication resource, and a memory resource.

10. A server as defined in claim 8, wherein the operations further include returning the call rejection message when the overload status indicates the terminating call server is in a first condition.

11. A server as defined in claim 10, wherein the call rejection message is returned irrespective of the overload status.

12. A server as defined in claim 10, wherein the first condition indicates the terminating call server has an insufficient resource to facilitate a communication session between the called device and a calling device.

13. A server as defined in claim 8, wherein the operations further include returning a call acceptance message when the terminating call server is in a normal state.

14. A server as defined in claim 8, wherein the overload status of the terminating call server is based on a state of at least one of a processing load of the terminating call server, or a utilization of a communication resource associated with the terminating call server.

15. A tangible machine readable storage device including instructions which, when executed, cause a tElephone NUMber mapping server to perform operations comprising:
    identifying a uniform resource identifier of a terminating voice over Internet protocol call server associated with a called device, the uniform resource identifier to be included in a call initiation request message;
    determining an overload status of the terminating voice over Internet protocol call server by:
        sending the call admission request message to a usage and capacity control server;
        receiving a call admission response message from the usage and capacity control server; and
        sending the call resection message instead of the uniform resource identifier in response to the overload status; and
    when the overload status of the terminating voice over Internet protocol call server indicates an overload condition, reducing a processing burden of the terminating voice over Internet protocol call server by:
        (a) withholding the uniform resource identifier from being sent to the terminating voice over Internet protocol call server from an originating voice over Internet protocol server;
        (b) sending a call rejection message to an originating voice over Internet protocol server without providing the originating voice over Internet protocol server with the uniform resource identifier; and
        (c) authorizing a call associated with the call initiation request message based on an overload status of a media gateway server associated with the terminating voice over Internet protocol server and a class-of-service weight associated with the called device.

16. A machine readable storage device as defined in claim 15, wherein the operations further include returning a call acceptance message when the terminating voice over Internet protocol call server is in a normal condition.

17. A machine readable storage device as defined in claim 15, wherein the operations further include:
    querying for a called party telephone number; and
    identifying the terminating voice over Internet protocol call server based on a device identifier for the called device, the device identifier determined in response to the query.

18. A machine readable storage device as defined in claim 15, wherein the operations further include returning the call rejection message irrespective of the overload status.

19. A machine readable storage device as defined in claim 15, wherein the overload status indicates an insufficient resource to facilitate a communication session between the called device and a calling device.

20. A machine readable storage device as defined in claim 15, wherein the determining of the overload status is based on a state of at least one of a processing load of the terminating voice over Internet protocol call server or a utilization of a communication resource associated with the terminating voice over Internet protocol call server.

* * * * *